US011959262B2

(12) United States Patent
Beck et al.

(10) Patent No.: US 11,959,262 B2
(45) Date of Patent: Apr. 16, 2024

(54) ELECTRONIC FAUCET WITH SMART FEATURES

(71) Applicant: ASSA ABLOY Americas Residential Inc., New Haven, CT (US)

(72) Inventors: Chasen Scott Beck, Costa Mesa, CA (US); Matthew Lovett, Lake Forest, CA (US); Stephen Blizzard, Mission Viejo, CA (US); Evan Benstead, Los Angeles, CA (US); Elena Gorkovenko, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 112 days.

(21) Appl. No.: 17/171,431

(22) Filed: Feb. 9, 2021

(65) Prior Publication Data

US 2021/0335358 A1    Oct. 28, 2021

Related U.S. Application Data

(63) Continuation of application No. 15/851,445, filed on Dec. 21, 2017, now Pat. No. 11,176,932.

(Continued)

(51) Int. Cl.
*G10L 15/22* (2006.01)
*E03C 1/04* (2006.01)
*E03C 1/05* (2006.01)

(52) U.S. Cl.
CPC ............ *E03C 1/055* (2013.01); *E03C 1/0412* (2013.01); *E03C 1/057* (2013.01); *G10L 15/22* (2013.01)

(58) Field of Classification Search
CPC ................................. G10L 15/22; E03C 1/055
See application file for complete search history.

(56) References Cited

U.S. PATENT DOCUMENTS

| 8,162,236 B2 | 4/2012 | Rodenbeck et al. |
| 9,194,110 B2 | 11/2015 | Frick et al. |

(Continued)

FOREIGN PATENT DOCUMENTS

| CN | 104238735 A | 12/2014 |
| CN | 105179780 A | 12/2015 |

(Continued)

OTHER PUBLICATIONS

Invitation to Pay Additional Fees with Partial International Search for Application No. PCT/US2017/067896 dated Mar. 27, 2018.

(Continued)

*Primary Examiner* — Douglas Godbold
(74) *Attorney, Agent, or Firm* — Merchant & Gould, P.C.

(57) ABSTRACT

A faucet is provided that electronically controls the flow volume and temperature of water being dispensed. The faucet illustratively includes a faucet body and a faucet handle. In some embodiments, the faucet may include a faucet body and be voice controlled. The faucet illustratively includes an inertial motion unit sensor mounted in the faucet handle to sense spatial orientation of the faucet handle. The faucet illustratively includes an electronic flow control system to adjust flow volume and temperature of water being dispensed. The faucet illustratively includes a controller configured to receive signals from the inertial motion unit sensor and control the electronic flow control system to adjust flow volume and temperature of water being dispensed based upon the position of the faucet handle.

19 Claims, 21 Drawing Sheets

Related U.S. Application Data

(60) Provisional application No. 62/438,492, filed on Dec. 23, 2016.

(56) References Cited

U.S. PATENT DOCUMENTS

| | | | | |
|---|---|---|---|---|
| 10,937,421 | B2* | 3/2021 | Beck | G06F 3/04812 |
| 11,176,932 | B2* | 11/2021 | Beck | E03C 1/0412 |
| 2001/0047262 | A1* | 11/2001 | Kurganov | G10L 15/26 |
| | | | | 704/270.1 |
| 2004/0193326 | A1* | 9/2004 | Phillips | F16K 31/042 |
| | | | | 700/282 |
| 2006/0186215 | A1* | 8/2006 | Logan | E03C 1/055 |
| | | | | 236/12.2 |
| 2009/0006099 | A1* | 1/2009 | Sharpe | G06F 3/167 |
| | | | | 704/E15.001 |
| 2011/0031331 | A1* | 2/2011 | Klicpera | G01F 15/0755 |
| | | | | 239/71 |
| 2012/0017367 | A1* | 1/2012 | Reeder | E03C 1/057 |
| | | | | 4/597 |
| 2012/0254810 | A1 | 10/2012 | Heck et al. | |
| 2012/0266983 | A1* | 10/2012 | Tsai | E03C 1/046 |
| | | | | 210/198.1 |
| 2013/0325484 | A1* | 12/2013 | Chakladar | G10L 15/26 |
| | | | | 704/275 |
| 2014/0092007 | A1* | 4/2014 | Kim | H04N 21/42203 |
| | | | | 345/156 |
| 2014/0163978 | A1* | 6/2014 | Basye | G10L 15/28 |
| | | | | 704/233 |
| 2014/0195248 | A1* | 7/2014 | Chung | G10L 15/22 |
| | | | | 704/275 |
| 2015/0142704 | A1* | 5/2015 | London | G06Q 10/10 |
| | | | | 706/11 |
| 2015/0262577 | A1* | 9/2015 | Nomura | G10L 15/22 |
| | | | | 704/231 |
| 2015/0308084 | A1* | 10/2015 | Thompson | E03C 1/055 |
| | | | | 700/283 |
| 2015/0308089 | A1* | 10/2015 | Thompson | G05B 15/02 |
| | | | | 137/78.1 |
| 2015/0322652 | A1* | 11/2015 | Mazz | G05D 7/0623 |
| | | | | 137/583 |
| 2015/0368887 | A1 | 12/2015 | Esche et al. | |
| 2016/0063989 | A1* | 3/2016 | Deleeuw | G06F 3/167 |
| | | | | 345/473 |
| 2016/0077530 | A1* | 3/2016 | Moran | E03C 1/055 |
| | | | | 700/282 |
| 2016/0289932 | A1* | 10/2016 | Mirakhimov | E03C 1/0401 |
| 2016/0328880 | A1* | 11/2016 | Sajapuram | H04N 5/232127 |
| 2016/0334807 | A1* | 11/2016 | Song | G05D 7/0635 |
| 2017/0053651 | A1* | 2/2017 | Lim | G10L 15/20 |
| 2017/0186428 | A1* | 6/2017 | Kunitake | G10L 17/06 |
| 2017/0268208 | A1* | 9/2017 | LaMarche | G05D 23/1393 |
| 2018/0216324 | A1 | 8/2018 | Beck et al. | |
| 2018/0244541 | A1* | 8/2018 | Pirutin | E03C 1/04 |
| 2020/0339438 | A1* | 10/2020 | Lautzenheiser | G09F 13/08 |

FOREIGN PATENT DOCUMENTS

| | | |
|---|---|---|
| EP | 2843657 A2 | 3/2015 |
| WO | 2016/040986 A1 | 3/2016 |

OTHER PUBLICATIONS

International Search Report and Written Opinion for Application No. PCT/US2017/067896 dated May 24, 2018.

* cited by examiner

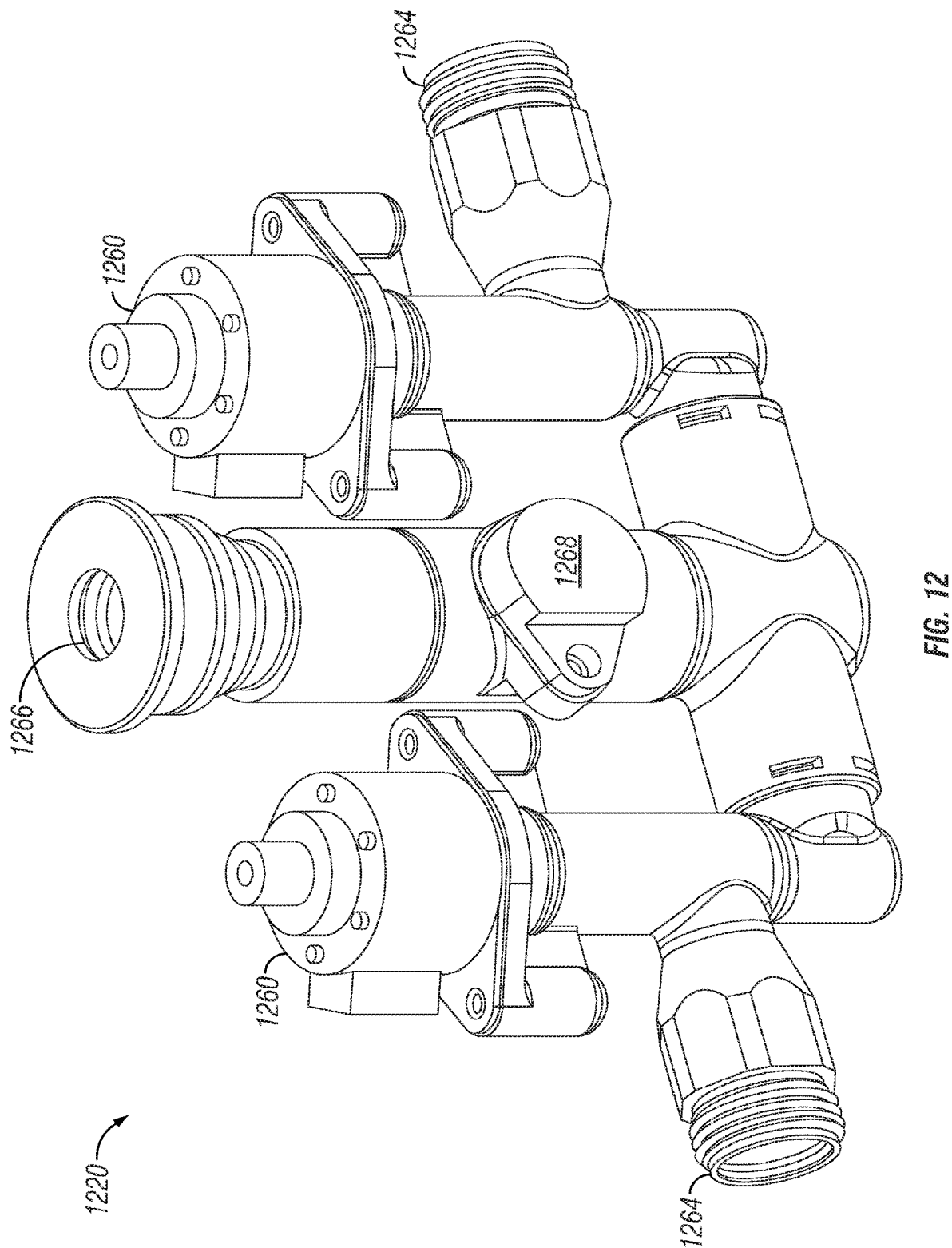

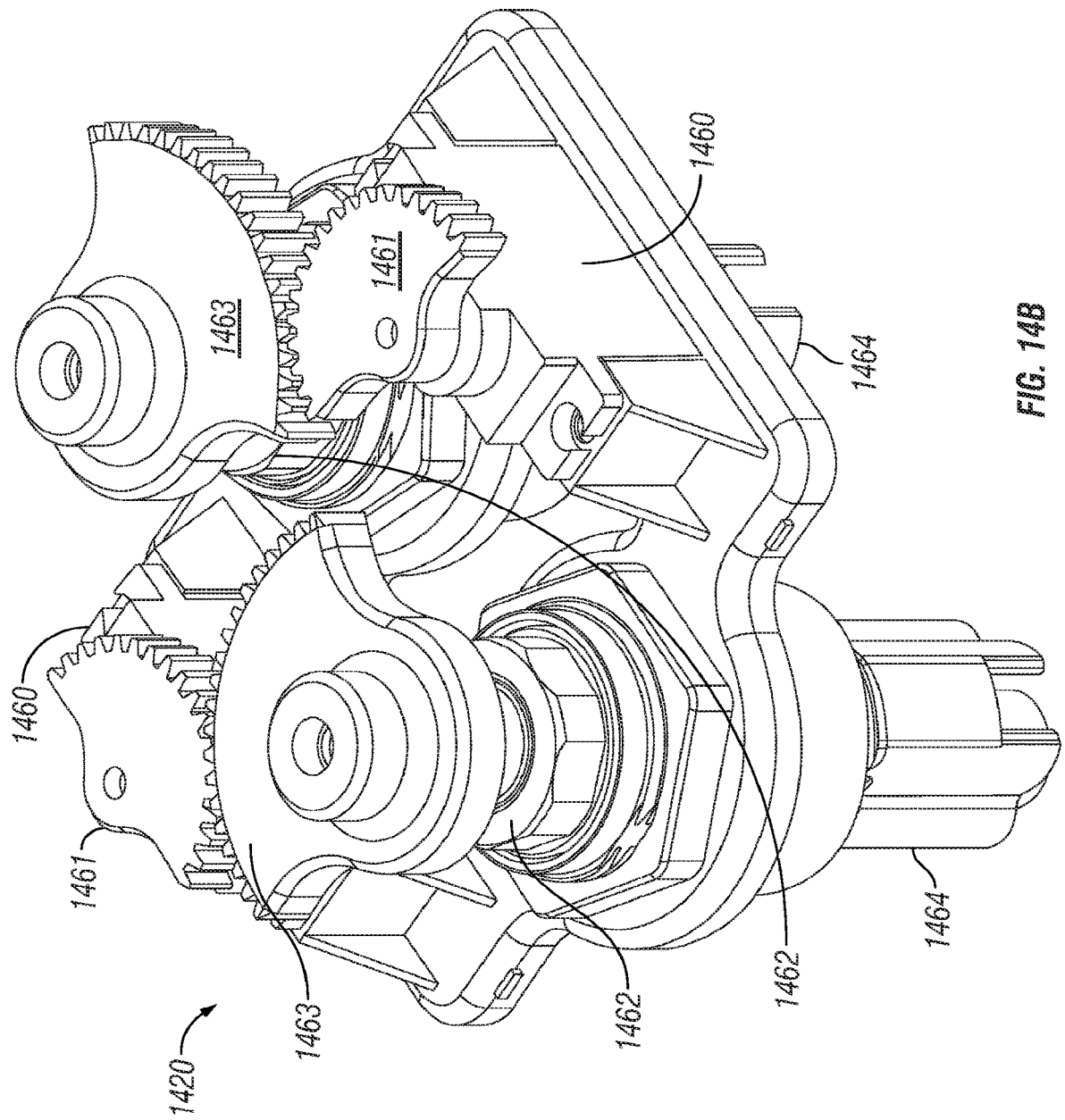

ELECTRONIC FAUCET WITH SMART FEATURES

CROSS-REFERENCE TO RELATED APPLICATIONS

This application is a continuation of U.S. application Ser. No. 15/851,445, filed Dec. 21, 2017, now U.S. Pat. No. 11,176,932; which claims priority to U.S. Provisional Patent Application No. 62/438,492, filed Dec. 23, 2016, the disclosures of which are hereby incorporated by reference in their entireties.

TECHNICAL FIELD

The present disclosure relates generally to faucets. In particular, the present disclosure relates to a faucet that is electronically controlled, for example, based on the spatial orientation of an input device and/or based on voice controls.

BACKGROUND

Faucets typically comprise mechanical parts to control the temperature and flow of water. In many situations, a mechanical valve controls the hot and cold water inlets through one or more faucet handles. Typically, a user manipulates the mechanical valve to adjust hot/cold mix and water flow by maneuvering faucet handle(s). Due to the mechanical connection between the handle and valve, the faucet body typically must be sized to accommodate these mechanical components. The bulk of these components present challenges in faucet designs.

With kitchen faucets, for example, attempts have been made to slim down the faucet body to create a more aesthetically pleasing design, but even these slim designs are dictated to a great extent by the need to include the mechanical valve in the faucet body, which is necessary to manipulate the temperature and flow of water. As a result, many components of kitchen faucets, such as the mechanical valve, are located above the kitchen countertop. This can make kitchen faucets bulky to some extent to allow room for the mechanical components.

SUMMARY

According to the present disclosure, a faucet is provided that electrically controls the temperature and flow of water dispensed. In some embodiments, the faucet illustratively includes a faucet body and a faucet handle. In some embodiments, such as some embodiments described herein with reference to voice control, the faucet illustratively includes a faucet body but not a faucet handle. In illustrative embodiments, the faucet includes an inertial motion unit sensor that is mounted in the faucet handle to sense spatial orientation of the faucet handle. For example, in some embodiments, the faucet handle may include a sensor that detects where the faucet handle is located in relation to an initial position. This allows the faucet to detect the position of the faucet handle after maneuvering the faucet handle similar to how a user would maneuver a mechanical faucet handle.

In illustrative embodiments, the faucet includes an electronic flow control system that adjusts flow volume and temperature of water being dispensed. In an illustrative embodiment, the faucet includes a controller configured to receive the signals from the inertial motion unit sensor and control the electronic flow control system to adjust flow volume and temperature of water being dispensed based upon the position of the faucet handle.

Additional features of the present disclosure will become apparent to those skilled in the art upon consideration of illustrative embodiments including the best mode of carrying out the disclosure as presently perceived.

BRIEF DESCRIPTION OF THE DRAWINGS

The detailed description makes reference to the accompanying figures in which:

FIG. 12 is a perspective view of some components of a flow control box according to some embodiments;

FIGS. 14A, 14B, and 14C illustrate some components of a flow control box 1420 with servomotor controls, according to an example embodiment.

DETAILED DESCRIPTION

Figure 1A:
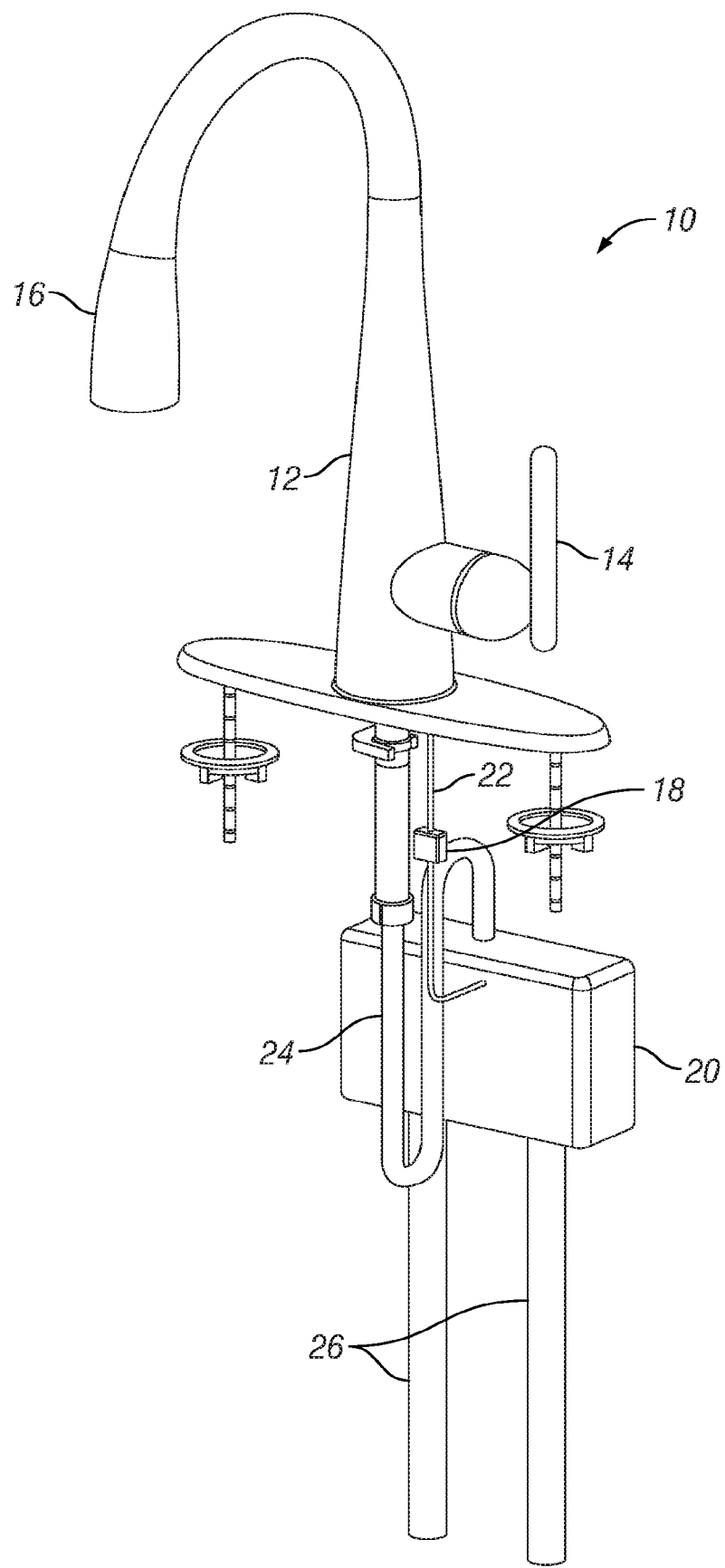
FIG. 1A is a perspective view of an example kitchen faucet according to an embodiment of the disclosure

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1A shows an example faucet 10 according to an embodiment of this disclosure. Although this disclosure will be discussed with regard to a kitchen faucet for purposes of example, the control system described herein could be implemented in any type of faucet, including bathroom faucets, whether the faucet has a single handle or two handles. Although the faucet 10 is shown as a pull-down kitchen faucet for purposes of example, this disclosure encompasses other types of faucets, including but not limited to pull-out faucets. In the example shown, the faucet 10 includes a faucet body 12, a faucet handle 14, and a spray head 16 that can be detached or undocked from the faucet body 12. The faucet body 12 can be shaped differently to provide a different connection with the faucet handle 14 or spray head 16. For example, in another embodiment the faucet body 12 could be flush with the faucet handle 14 to provide a more streamlined appearance that reduces the space required by the faucet 10. In another embodiment, the faucet handle 14 does not need to be connected to directly to the faucet body 12, but could be remote from the faucet body 12.

As shown, the faucet 10 can be manually controlled (e.g., the temperature, water flow, and on/off) using the handle 14. In some cases, the faucet 10 could be manually adjusted electronically, such as using a hands-free sensor, touch activation, buttons or other interface. As discussed more below, the handle 14 can detect its spatial orientation and send signals to a controller 18 to control water flow using a flow control box 20 through signal wires 22.

As discussed further herein, the faucet 10 can also be electronically controlled using voice and/or speech control. The terms "voice control" and "voice recognition" are used interchangeably to mean broadly a feature of the faucet for identifying a user based on a user's spoken words. With respect to voice recognition, for example, the faucet could have user-based presets for temperature, flow, volume, filtering, and/or other faucet controls based on an identification of the user using voice recognition. In one embodiment, for example, the faucet could have a user-based preset for a volume dispensed for a container of water. For example, User 1 could have a 20-ounce preset in response to a command to "Dispense water into my tumbler" while User 2 could have a 32-ounce preset for the same command. The faucet could include voice recognition to identify which user stated the command and dispense a volume of water consistent with that user's preset. The faucet could also include speech recognition to parse a user's spoken words into a command to be executed by the faucet. For example, the faucet's speech recognition could interpret between commands "Dispense 8 ounces of water" and "Dispense water at 150 degrees." In some cases, voice recognition and speech recognition could be used in tandem. For example, the faucet could use voice recognition to understand a preset volume for the command "Dispense water into my tea cup" while speech recognition would parse the spoken words into a command recognizable by the faucet. Throughout the specification, the examples may describe only voice recognition or only speech recognition for purposes of simplifying the disclosure, but it should be appreciated that the faucet could include both voice recognition and speech recognition in each of these examples depending on the circumstances.

In the embodiment shown in FIG. 1A, the flow control box 20 is connected to a pull down hose 24 to provide fluid communication from water supply inlet hoses 26 to spray head 16. As is typical, the water supply inlet hoses 26 can supply cold and hot water to be released from the spray head 16.

Figure 1B:
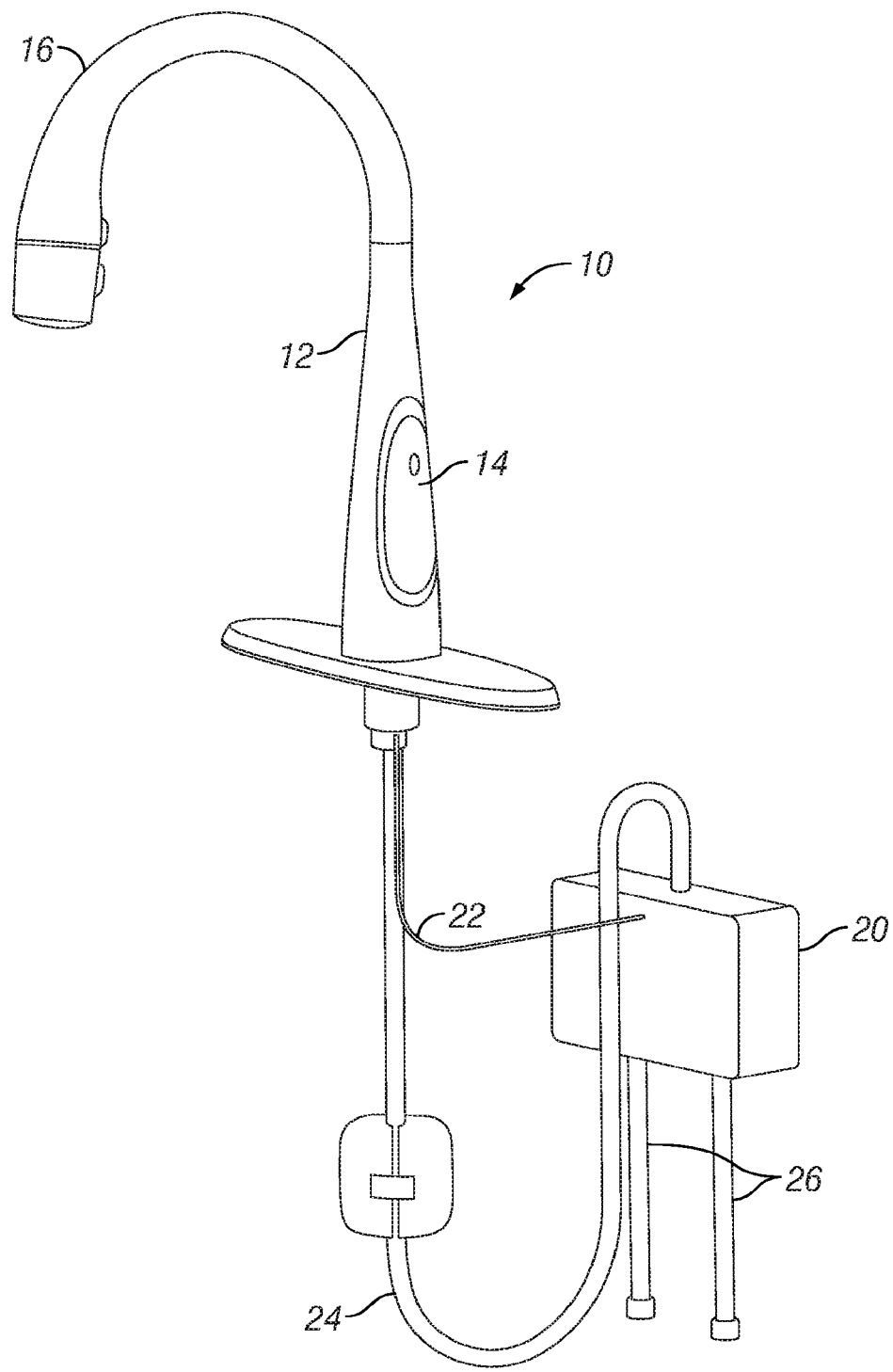
FIG. 1B is a perspective view of an example kitchen faucet according to an embodiment of the disclosure.
Figure 1C:
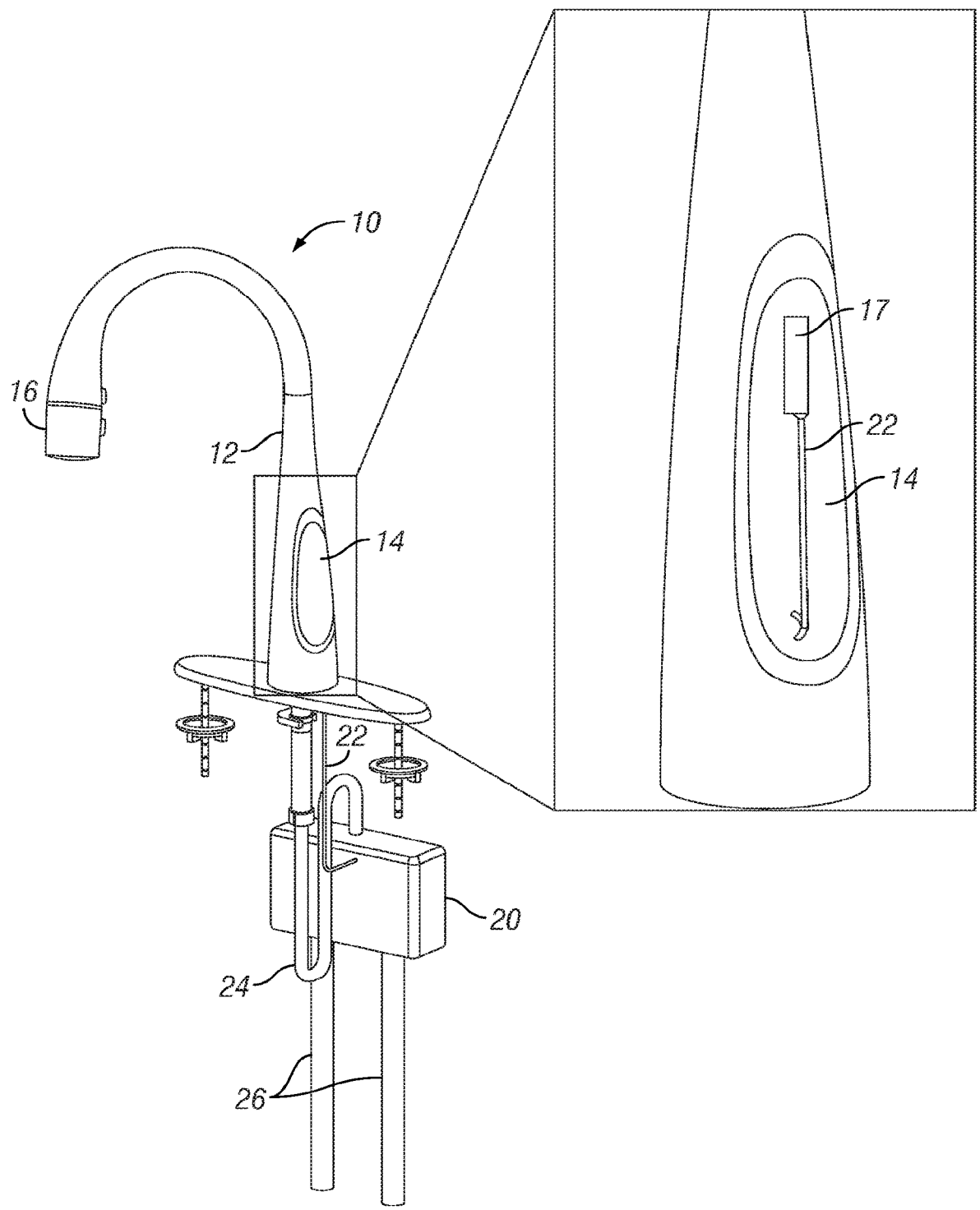
FIG. 1C is a perspective view of an example kitchen faucet of FIG. 1B further illustrating an exploded view of the faucet handle.

FIG. 1B is a perspective view of an example kitchen faucet according to an embodiment of the disclosure. FIG. 1C is a perspective view of the example kitchen faucet of FIG. 1B further illustrating an exploded view of the faucet handle with a cut-out showing some components. In the example shown in FIGS. 1B and 1C, the faucet 10 includes a faucet body 12, a faucet handle 14, and a spray head 16 that can be detached or undocked from the faucet body 12. The faucet handle 14 may be substantially or fully integrated into the faucet body 12. The handle 14 may detect its spatial orientation and send signals to a controller 18 to control water flow using a flow control box 20 through signal wires 22. Additionally or alternatively, as shown in the cut-out portion of the faucet handle 14, the faucet 10 may include circuitry 17, such as control circuitry (e.g., microcontrollers, processors, or other embedded systems), networking circuitry, sensors and sensor circuitry (e.g., IMUs, microphones, speakers, flow, pressure, temperature, hall effect, etc.), or other circuitry. The circuitry 17 may be coupled to the signal wire 22 that in turn may be coupled to the controller 18 or other control circuitry.

Figure 1D:
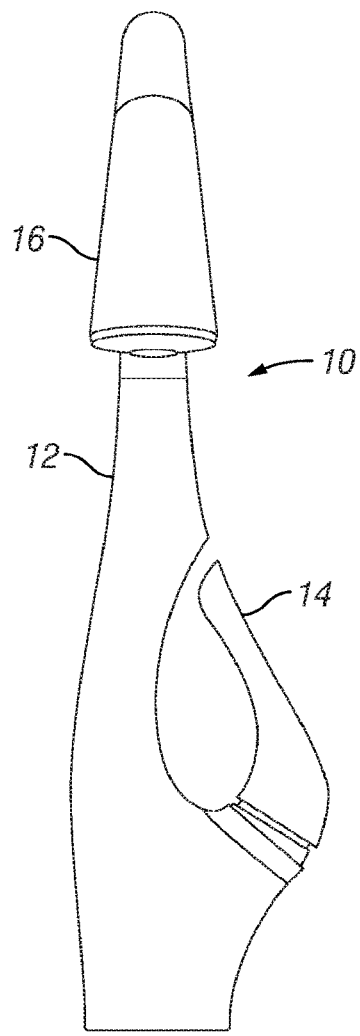
FIG. 1D is a front view of an example kitchen faucet according to an embodiment of the disclosure.

FIG. 1D is a perspective view of an example kitchen faucet according to an embodiment of the disclosure. In the example shown in FIG. 1D, the faucet 10 includes a faucet body 12, a faucet handle 14, and a spray head 16 that can be detached or undocked from the faucet body 12.

Figure 1E:
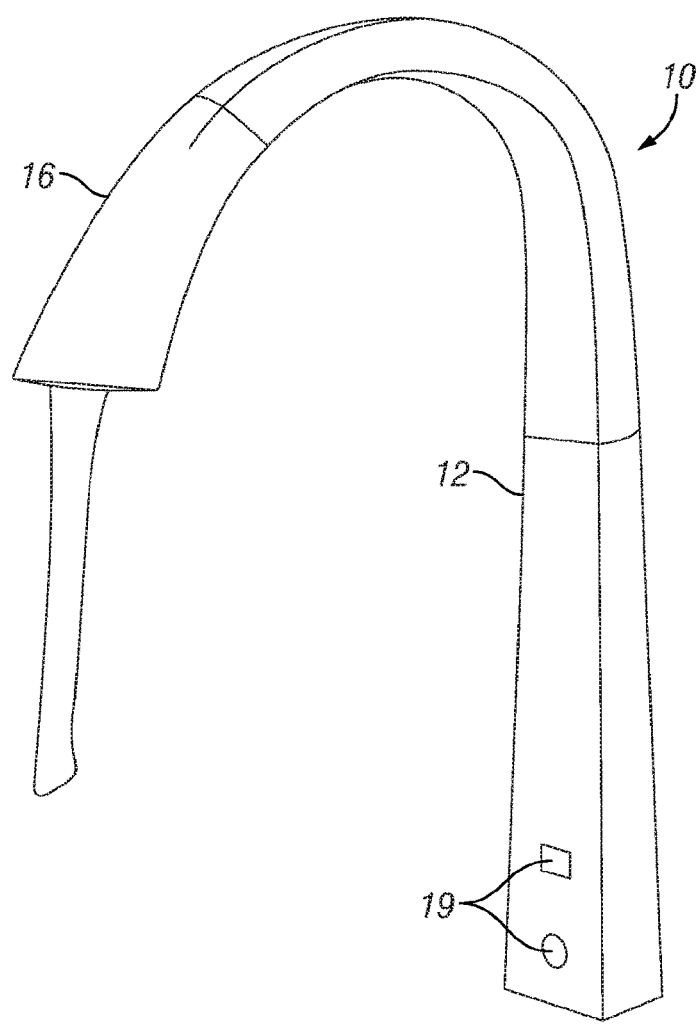
FIG. 1E is a perspective view of an example voice-controlled kitchen faucet according to an embodiment of the disclosure.

FIG. 1E is a perspective view of an example voice-controlled kitchen faucet according to an embodiment of the disclosure. In the example shown in FIG. 1E, the faucet 10 includes a faucet body 12, a spray head 16 that can be detached or undocked from the faucet body 12, and an interface 19. In some embodiments like the example shown in FIG. 1E, the faucet 10 does not include a faucet handle 14 because it is otherwise controlled (e.g., via voice commands). In some embodiments, the interface 19 is integrated within the faucet body 12. FIG. 1E illustrates an interface 19 with two icons (a sink icon and a logo icon) illuminated for purposes of example. When the interface 19 is not illuminating icons, the faucet body 12 may appear to be a single integrated piece without any interface 19. Thus, the interface 19 may be seen only when one or more portions of the interface 19 are illuminated or otherwise actuated. As an example, the faucet body 12 may look like a single piece of brushed chrome when the interface 19 is not illuminated or actuated. In some embodiments (e.g., when the faucet 10 receives a command or voice command), an LED may be illuminated on the interface 19 and light may show through the faucet body 12 (e.g., in the shape of an icon) like a one-way screen.

Figure 2:
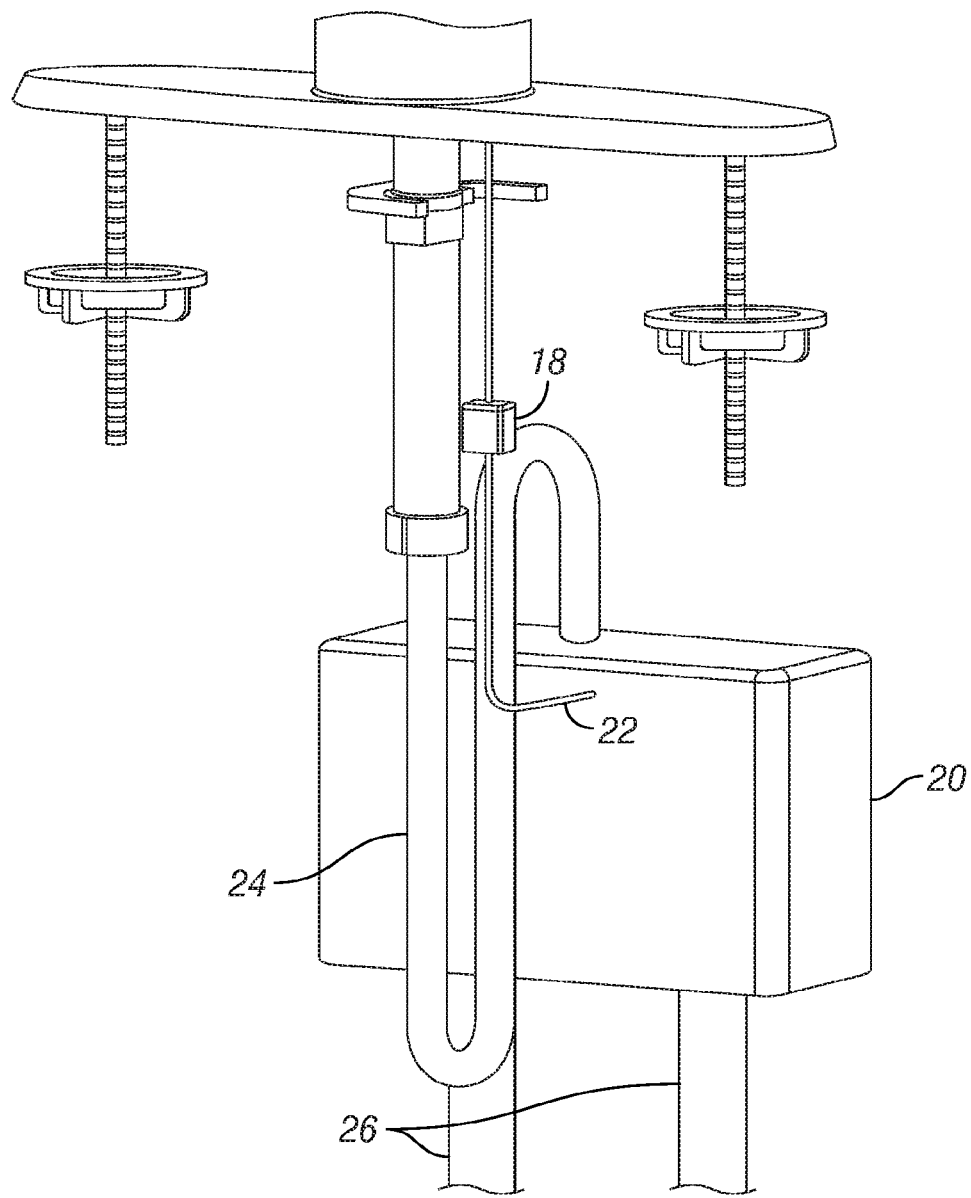
FIG. 2 is a detailed perspective view of the example kitchen faucet shown in FIG. 1A below a countertop.

Referring to FIG. 2, a close look to the components of the faucet 10 under the counter top (not shown) is provided. As mentioned above, in one embodiment shown the controller 18 is connected to the flow control box 20 through signal wires 22 to analyze the signals to send from faucet handle 14 to control the flow of water from the water supply inlet hoses 26. The flow control box 20 can mix the water from water supply inlet hoses 26 to provide a water flow of a user-selected temperature to be released from the spray head 16. The flow control box 20 as shown is located under the counter top of the faucet 10. The flow control box 20 can be located elsewhere as appropriate to receive signals from controller 18 through signal wires 22 and provide water to be released from spray head 16 through pull down hose 24. The flow control box 20 can be located in a different position to provide more space underneath the counter top of faucet 10 depending on the circumstances.

In the example shown, the controller 18 is located outside of the flow control box 20. In another embodiment, the controller 18 can also be located inside of the flow control box 20. In another embodiment, the controller 18 can be located above the counter top of the faucet 10. The controller 18 could also be located inside the faucet handle 14.

The connection between the faucet handle 14, controller 18, and flow control box 20 is shown as a wired connection through signal wires 22. In another embodiment, the communication between the faucet handle 14, controller 18, interface 19, and/or flow control box 20 can be done wirelessly.

Figure 3:
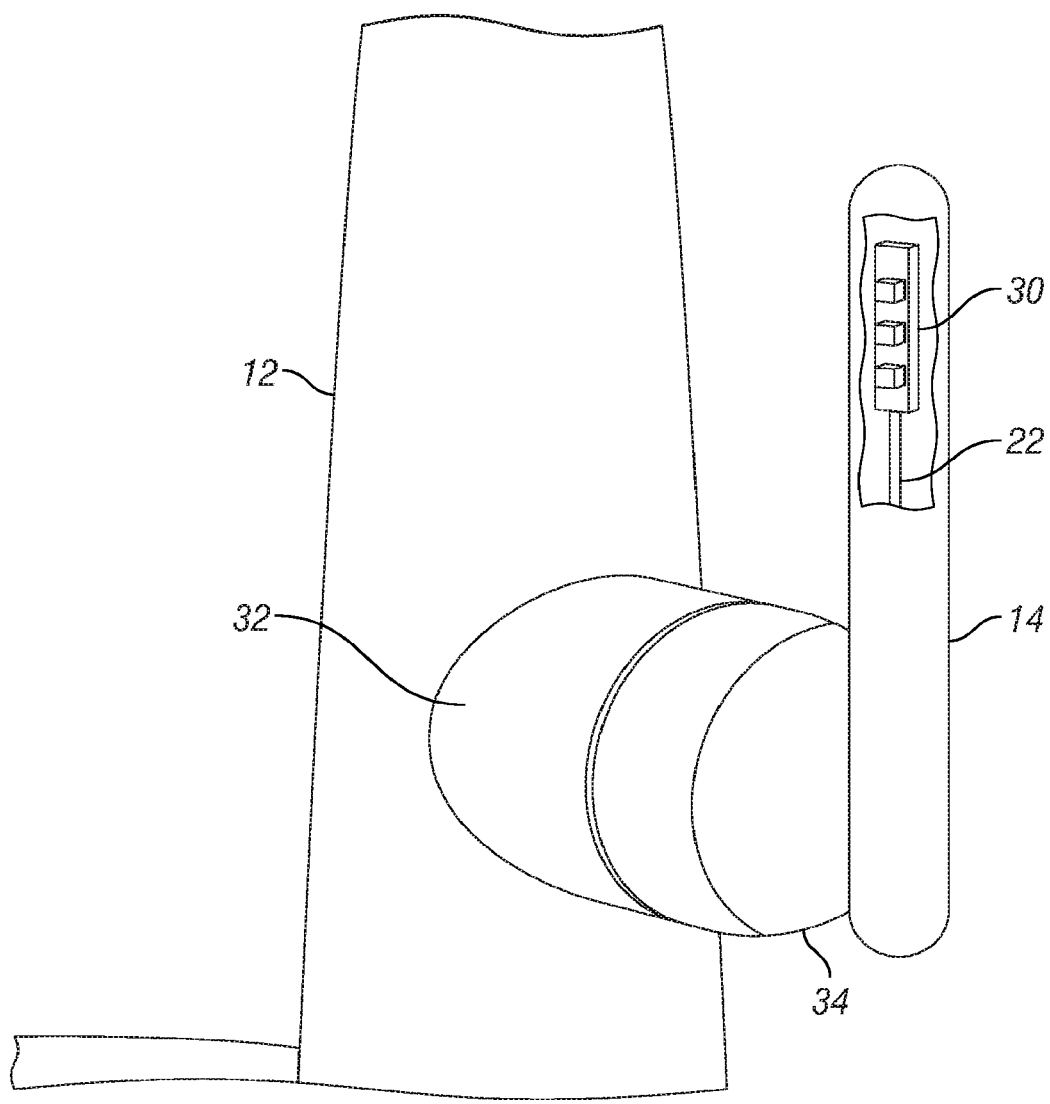
FIG. 3 is a detailed perspective view of a faucet handle of the example kitchen faucet of FIG. 1A with a breakaway to reveal the internals of the faucet handle according to an embodiment of the disclosure.

Referring to FIG. 3, a closer look at the faucet handle 14 is provided. There is a cut away to reveal the components inside of the faucet handle 14. In the example shown, the faucet handle 14 includes a sensor printed circuit board assembly (PCBA) 30 connected to the signal wire 22. As shown, the faucet handle 14 is connected to the faucet body 12 through a stationary faucet handle mount 32 in conjunction with a movable faucet handle mount 34. The stationary faucet handle mount 32 is connected to the faucet body 12. The stationary faucet handle mount 32 can be a part of the faucet body 12. The movable faucet handle mount 34 is movably connected to the stationary faucet handle mount 32. The movable faucet handle mount 34 is also connected to the faucet handle 14. The movable faucet handle mount 34 can be a part of the faucet handle 14. The connection between the stationary faucet handle mount 32 and the movable faucet handle mount 34 allows the faucet handle 14 to move at least rotationally along two axes of rotation. In one embodiment, one axis of rotation can represent the water flow being released from the spray head 16, and the other axis of rotation can represent the temperature of water being released from the spray head 16. Although the stationary faucet handle mount 32 and the movable faucet handle mount 34 extend from the faucet body 12 in the example shown, these components could be integral with the faucet body 12 to provide more flexibility for shape and size of the faucet body 12.

In one embodiment, the faucet handle 14 can be movably connected to the faucet body 12 without the stationary faucet handle mount 32 and the moveable faucet handle mount 34. The faucet handle 14 can also be movably connected to the spray head 16. As discussed above, the faucet handle 14 can be separate from the faucet body 12 altogether and be movably connected to a surface for movement along two axes of rotation.

The sensor PCBA 30 is configured to detect the spatial orientation of the faucet handle 14. In one embodiment, the sensor PCBA 30 is an inertial motion unit (IMU) sensor 30. The sensor PCBA 30 can send signals through signal wires 22 to controller 18 to interpret the signals. After the controller 18 determines a spatial orientation of the faucet handle 14 through the signals provided from sensor PCBA 30, the controller 18 can send signals to the flow control box 20 and control the water temperature and the water flow to be released from the spray head 16.

Figure 4:
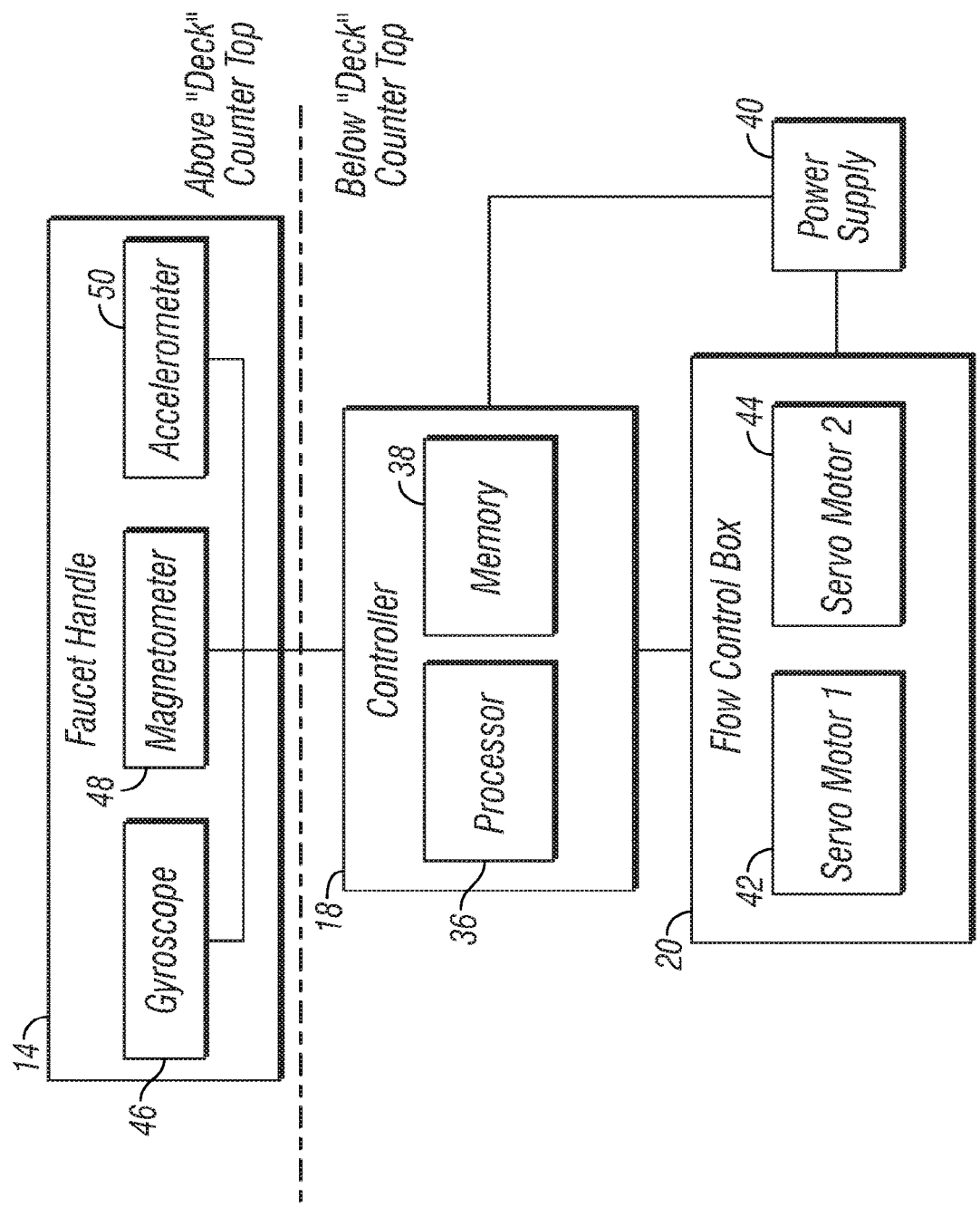
FIG. 4 is a simplified block diagram of an example control system for controlling dispensing of water from a kitchen faucet according to an embodiment of the disclosure.

Referring to FIG. 4, there is shown an example electronic control system for controlling dispensing of water from the faucet 10. In the example shown, the control system includes the controller 18 including a processor 36 to process the signals received from the faucet handle 14 to send a signal to the flow control box 20 and a memory 38 to store instructions to be executed by the processor 36. The controller 18 may also be connected to circuitry 17 (shown in FIG. 1C). The control system also includes a power supply 40 that is connected to the controller 18 and the flow control box 20.

The control system also includes the flow control box 20 including a servo motor 142 and a servo motor 244 to control the water received from water supply inlet hoses 26 (not shown) to output water of a determined flow rate and a determined temperature based upon the spatial orientation of the faucet handle 14. Servo motor 142 may be a servo motor for the control of cold water into the system. Servo motor 244 may be a servo motor for the control of hot water into the system 70.

In some embodiments, the control system additionally or alternatively includes a faucet handle 14 (or other componentry) that receives inputs from at least one of a gyroscope 46, magnetometer 48, and accelerometer 50 of the sensor PCBA 30 (FIG. 3). In some embodiments, the control system additionally or alternatively includes circuitry 17 (e.g., a microphone or networking circuitry) that receives inputs (e.g., a voice command).

In one embodiment, the faucet handle 14 is located above the countertop and the controller 18, flow control box 20, and power supply 40 are located below the countertop. The components of the control system may be arranged above and below the counter top as appropriate. The power supply 40 provides power to the faucet handle 14 through the controller 18. In another embodiment, the power supply 40 may be connected directly to the faucet handle 14. The power supply 40 can be power supplied from an outlet and converted as necessary for use by the controller 18, flow control box 20, and faucet handle 14. The flow control box 20 may have a separate power supply 40 than the controller 18. The power supply 40 may be any power source to supply electrical power for the function of the faucet handle 14, controller 18, and the flow control box 20.

In one embodiment, the faucet handle 14 detects its spatial orientation through the use of at least one of the gyroscope 46, the magnetometer 48, and accelerometer 50. In another embodiment, the faucet handle 14 may use other sensors to detect its spatial orientation. The faucet handle 14 can send the signals received from the sensors 46, 48, 50 to the controller 18 to use an algorithm in order to determine the temperature of water and the flow rate of the water to be released from the spray head 16. In another embodiment, the controller 18 may use a look-up table to determine the temperature of water and the flow rate of the water to be released from the spray head 16. After determining the temperature and flow rate of the water, the controller 18 can send a signal to flow control box 20 to control the servo motor 1 42 and servo motor 2 44 to adjust the temperature and flow rate of the water being dispensed from the spray head 16. The flow control box 20 receives hot and cold water from the water supply inlet hoses 26 to output the water of a desired temperature and flow rate through the pull down hose 24 to the spray head 16.

In another embodiment, flow control box 20 may use more than two servo motors in order to control the temperature and flow rate of the water. The flow control box 20 may also use a series of solenoids, needle valve, stepper motor, etc. in order to control the temperature and flow rate of the water depending on the circumstances.

Figure 5:
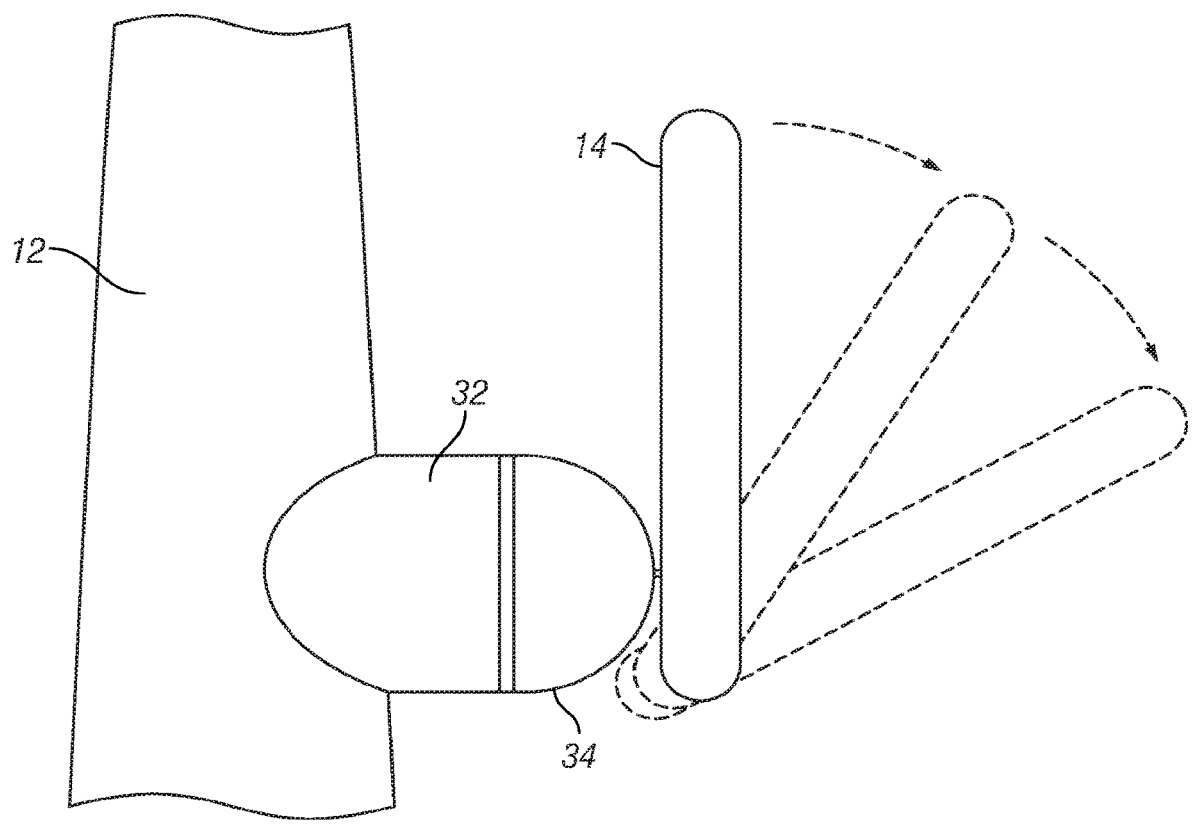
FIG. 5 is a front view of the faucet handle showing the degrees of rotation that the faucet handle can travel along one axis of the faucet handle according to an embodiment of the disclosure.

Referring to FIG. 5, there is shown progressive movement of the faucet handle 14 from an initial position where no water is being released to a fully extended position where the flow rate of water is at a maximum. In the example shown, the faucet body 12 is connected to the stationary faucet handle mount 32. The movable faucet handle mount 34 is movably connected to the stationary faucet handle mount 32. The faucet handle 14 is connected to the movable faucet handle mount 34 so a user can maneuver the faucet handle 14 along one axis as shown in relation to the faucet body 12.

In the shown embodiment, there are three different positions as the faucet handle 14 starts from an initial position rotating all the way to the fully extended position in phantom. In another embodiment, there may be a plurality of positions that the faucet handle 14 can achieve between an initial positions to a fully extended position. In one embodiment, as the faucet handle 14 is rotated in the way shown in FIG. 5, the faucet handle 14 sends signals to the controller 18 to control the flow control box 20 to release more water of a temperature determined as discussed below. In one embodiment, the faucet 10 does not release any water when the faucet handle 14 is in the initial position. The faucet 10 begins to release water of variable amounts when the faucet handle 14 is rotated from the initial position depending on the position of the faucet handle 14. The sensor PCBA 30 detects the position using the gyroscope 46, the magnetometer 48, and/or the accelerometer 50 and sends signals to the controller 18 to determine how much water is to be released. The controller 18 then sends a signal to the flow control box 20 to release water of a determined flow rate out of the pull down hose 24 to the spray head 16 through the use of the servo motors 42, 44.

Figure 6:
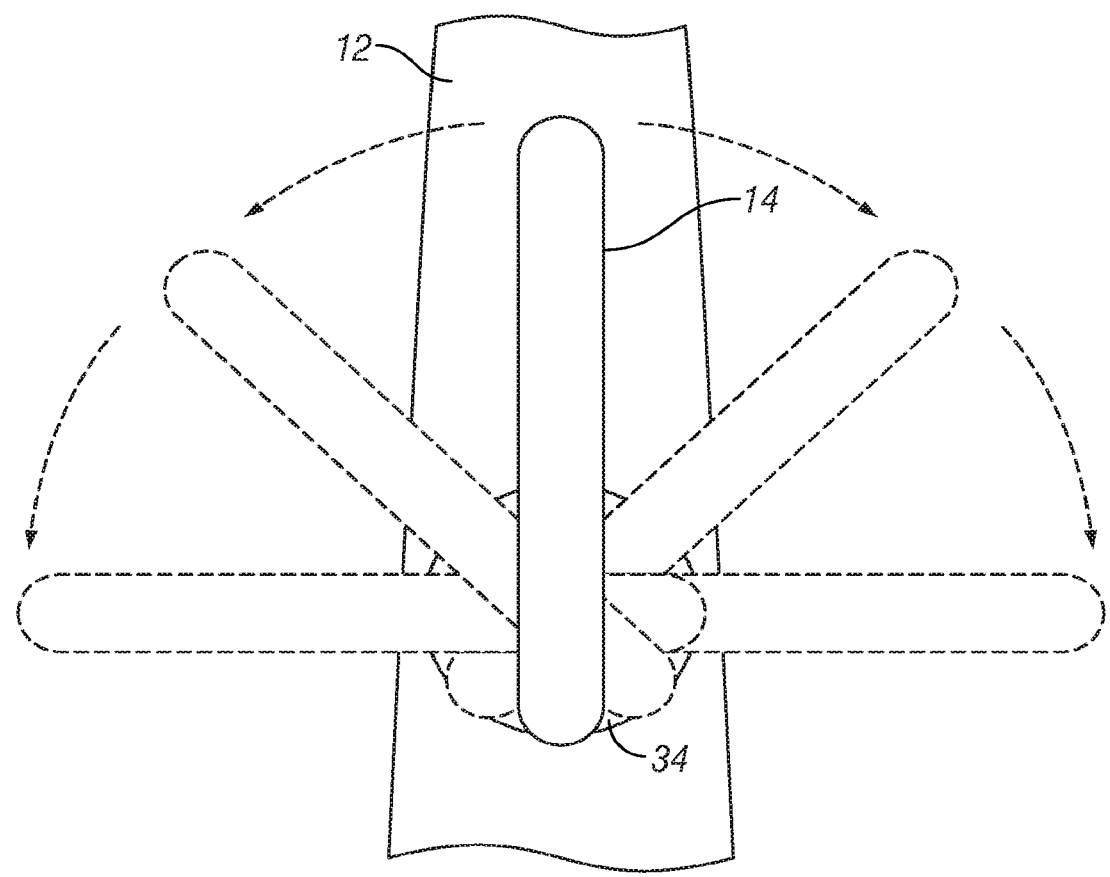
FIG. 6 is a side view of the faucet handle showing the degrees of rotation that the faucet handle can travel along another axis of the faucet handle according to an embodiment of the disclosure.

Referring to FIG. 6, there is shown rotation of the faucet handle 14 from an initial position to one side and from the initial position to the other side. In the example shown, the faucet handle 14 is connected to the movable faucet handle mount 34 that connects to the stationary faucet handle mount 32 (FIG. 3) which is connected to the faucet body 12. The connections allow the faucet handle 14 to rotate as shown. There is one initial position of the faucet handle 14 and four other positions shown in phantom. In another embodiment, there is a plurality of positions that the faucet handle 14 can achieve between the fully extended left position to the fully extended right position.

In one embodiment, as the faucet handle 14 is rotated along the axis of rotation the temperature of water the flow control box 20 releases to the pull down hose 24 connected to the spray head 16 changes. The faucet handle 14 detects its position using the sensor PCBA 30 and sends a signal to the controller 18. The controller 18 determines a temperature of the water to be released from the spray head 16 depending on the spatial orientation of the faucet and sends a signal to the flow control box 20 to output water of a certain temperature and flow rate through the pull down hose 24 to the spray head 16 as discussed above. The flow control box 20 can control the servo motors 42, 44 to release a specific amount of cold and hot water from the water supply inlet hoses 26 to achieve the desired temperature for the water released from the pull down hose 24 to the spray head 16.

In one embodiment, the fully extended left position of the faucet handle 14 could be for the release of the hottest water available. The fully extended right position of the faucet handle 14 can be for the release of the coldest water available. The initial position of the faucet handle 14 can be for the release of an even mix of hot and cold water available. The positions in between the fully extended left position of the faucet handle 14 and the fully extended right position of the faucet handle 14 can be varying mixes of hot and cold water to achieve relatively cold water or relatively hot water. The water can become progressively colder or hotter depending on which direction the faucet handle 14 is rotating towards. In another embodiment, the cold and hot directions may be switched so the fully extended left position of the faucet handle 14 can be for the release of the coldest water available and the fully extended right position of the faucet handle 14 can be for the release of the hottest water available.

Figure 7:
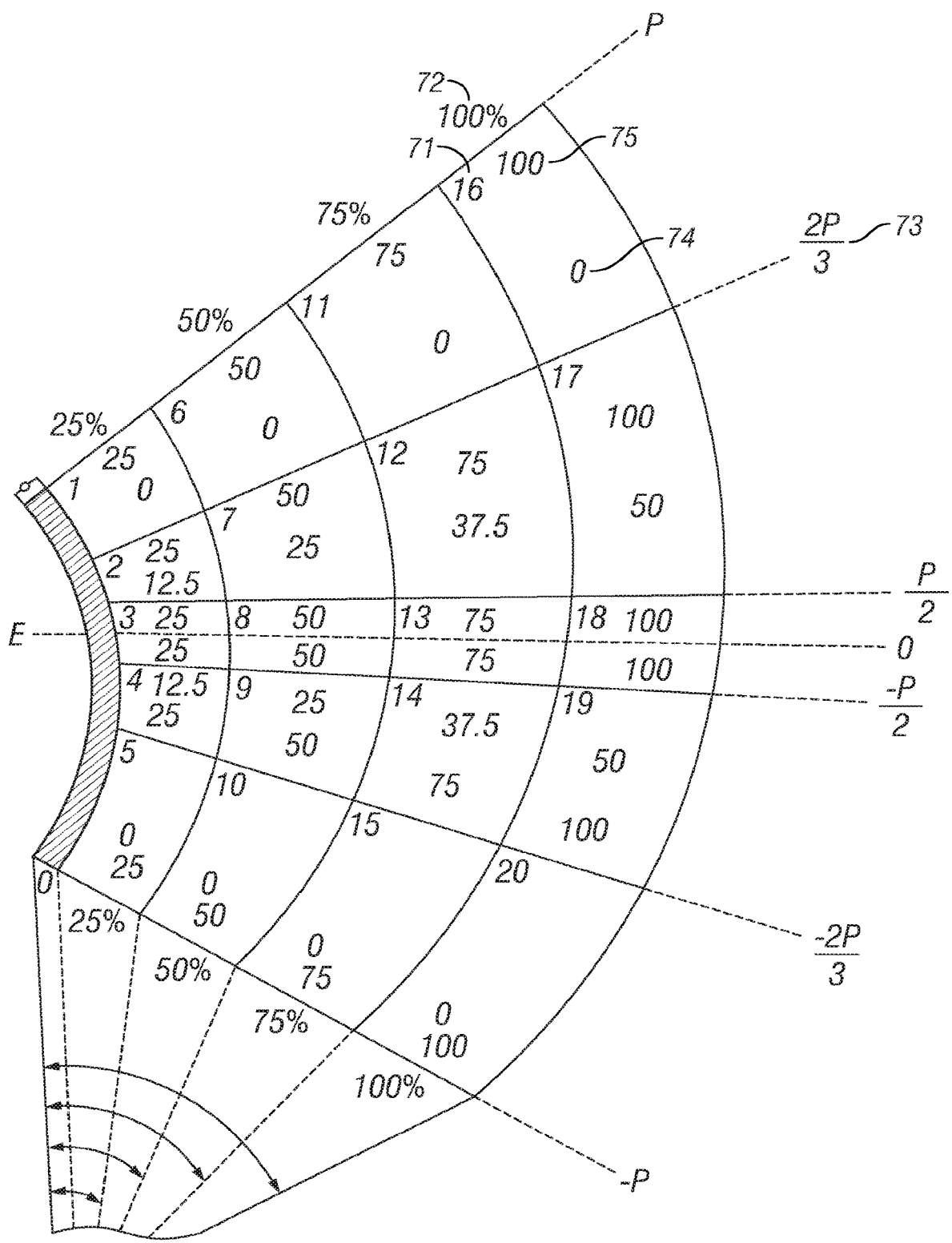
FIG. 7 is a simplified diagram of water values released from two water supply inlet hoses given a position of the faucet handle according to an embodiment of the disclosure.

Referring to FIG. 7, a table is shown that shows an example distribution of water from water supply inlet hoses 26 released through flow control box 20. The table covers the range of motion available for the faucet handle 14. The sections are labeled with section numbers 71 and are located along a spectrum of percentage water flow 72 and a temperature turn value 73. The sections further include a value for the servo motor 1 water inlet 74 and a value for the servo motor 2 water inlet 75. In one embodiment, the value for the servo motor 1 inlet 74 can represent the cold water value and the value for the servo motor 2 inlet 75 can represent the hot water value. In another embodiment, the servo motor values 74, 75 may be switched so that the value for servo motor 1 inlet 74 represents the hot water value and the value for servo motor 2 inlet 75 represents the cold water value. In the shown example, the percentage of water flow 72 ranges from 0 to 100% with four divisions. In one embodiment, the percentage of water flow 72 can be 25%, 50%, 75%, and 100%. In another embodiment, the percentage of water flow 72 may be divided in any way between 0 to 100%.

The temperature turn value 73 can represent the amount of rotation that is achieved for the faucet handle 14. For example, P can represent the fully extended right position of the faucet handle 14 and P can represent the fully extended left position of the faucet handle 14. In another embodiment, the positions may be switched so P can represent the fully extended left position of the faucet handle 14 and −P can represent the fully extended right position of the faucet handle 14. In the shown example, there are five divisions along the spectrum of temperature turn values 73. In another embodiment, there may be any number of divisions. In another embodiment, P may be divided into quarters and sixths. The temperature turn value 73 can be divided into a plurality of division.

The table is divided into several sections as shown in FIG. 7. Each section represents a location the faucet handle 14 can be located during operation. If the faucet handle 14 is located within one of the sections then the faucet 10 would release water according to the values 74, 75 within the section. For example, if the faucet handle 14 has been extended between 75% to 100% of the percentage of water flow 72 and the faucet handle 14 has been turned to a value between 2P/3 and P for the temperature turn value 73, the faucet 10 would release 100 or the maximum amount of water from servo motor 244 and no water for servo motor 142.

In another embodiment, the table shown in FIG. 7 can be divided into a plurality of sections such that a continuous change of water flow from water supply inlet hoses 26 through the servo motors 42, 44 can be achieved as the faucet handle 14 changes location along the spectrum of percentage of water flow 72 and temperature turn value 73. In the shown example, the values have a fixed maximum depending on where the faucet handle 14 is located along the spectrum of percentage of water flow 72. The servo motor 42 or 44 side that the faucet handle 14 is located under has the maximum percentage of water flow 72 for the value for servo motor inlet 74 or 75 and the other value for servo motor inlet 74 or 75 is decremented down to zero on the far end depending on how many divisions there are for the temperature turn value 73. In the shown example, there are five divisions and within the first division on each side both of the values for the servo motor inlets 74, 75 are at the maximum depending on where along the spectrum the faucet handle 14 falls on the percentage of water flow 72. Within the next division, the value for the servo motor inlet 74 or 75 for the side the faucet handle 14 is located stays the maximum value and the other value for the servo motor inlet 74 or 75 drops to half of the maximum value. Within the last division, the value for the servo motor inlet 74 or 75 for the side the faucet handle 14 is located stays the maximum value and the other value for the servo motor inlet 74 or 75 drops to zero.

In another embodiment, the values for the servo motor inlets 74, 75 may be decremented in a different way. In another embodiment, the values 74, 75 may be decremented by thirds. The settings for the divisions may be changed depending on user preference. More divisions can result in a more continuous change in water temperature and water flow. The fewer divisions can result in energy conservation since the servo motors 42, 44 will not need to be changed in operation as frequently.

The controller 18 can receive the signals from the sensor PCBA 30 to detect the spatial orientation of the faucet handle 14. The controller 18 can use an algorithm to calculate where in the spectrum of percentage of water flow values 72 and temperature turn values 73 the faucet handle 14 is located from the signals received from the sensor PCBA 30. After crossing a threshold for either percentage of water flow values 72 or temperature turn values 73, the controller 18 can send signals to the flow control box 20 to operate the servo motors 42, 44 to release water of an updated temperature and water flow depending on the spatial orientation of the faucet handle 14.

In another embodiment, the controller 18 can use a look-up table to see what values the controller 18 should set for the values of the servo motor water inlets 74, 75. The controller determines the spatial orientation of the faucet handle 14 and determines which section the faucet handle 14 is located. If the faucet handle 14 located in section number 1671, then the controller 18 sends a signal to the flow control box 20 to close the water supply inlet hose 26 for servo motor 1 42 and open the water supply inlet hose 26 for servo motor 2 44 to the maximum in order to achieve the value for servo motor inlet 1 74 of 0 and the value for servo motor inlet 2 75 of 100.

Figure 8:
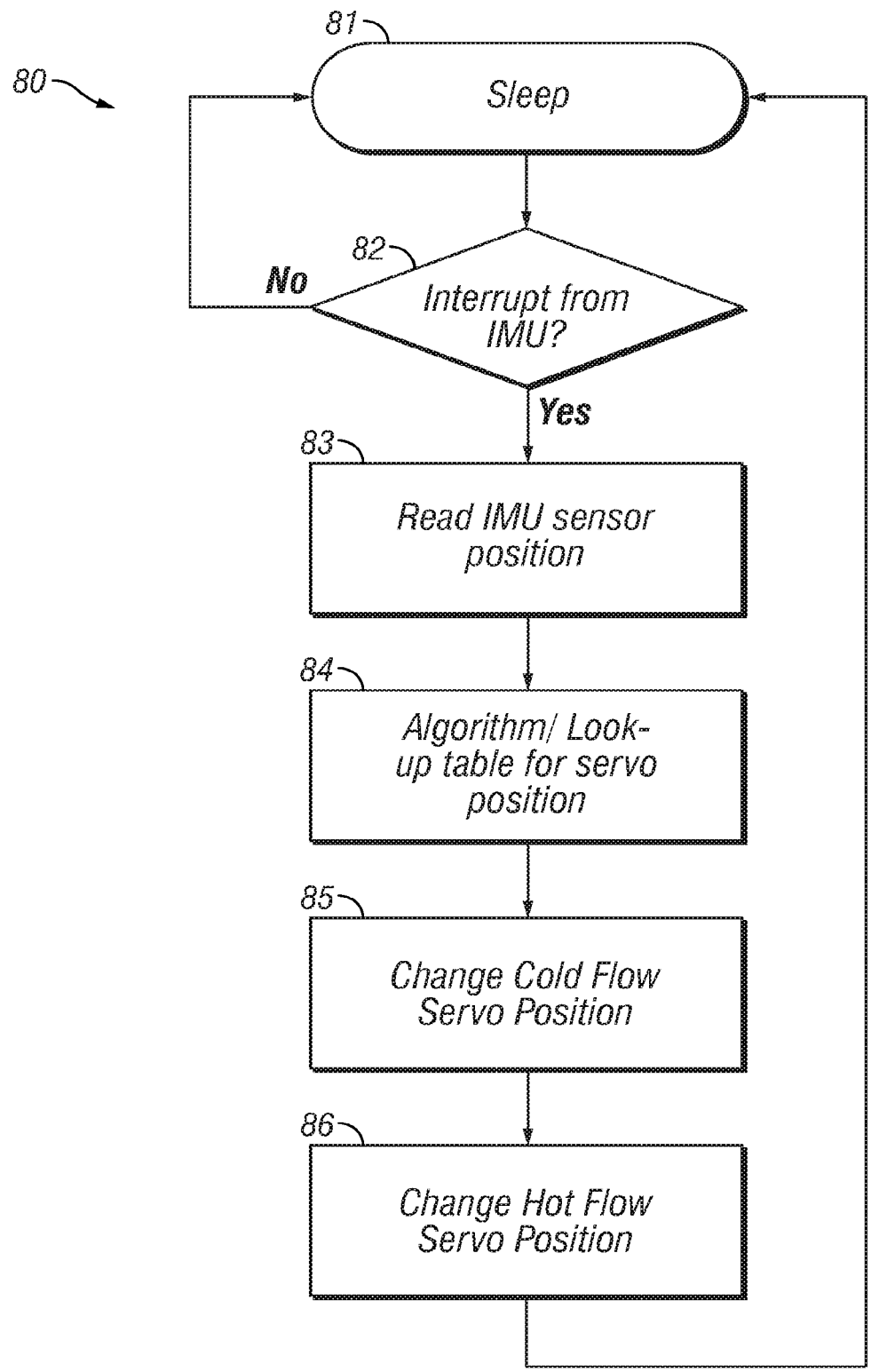
FIG. 8 is a simplified flowchart showing an example operation of the faucet according to an embodiment of the disclosure.

FIG. 8 is a simplified flow chart showing an example operation of the faucet 10. In the shown example, the faucet 10 uses an interrupt method 80 of controlling the operation of the flow control box 20. In the shown example, the interrupt method 80 begins with operation 81 in which the controller 18 is in a sleep state to conserve energy waiting to receive an interrupt from the sensor PCBA 30 or inertial motion unit (IMU) sensor 30. After operation 81, the process continues to operation 82 where there is a check for an interrupt from the IMU sensor 30. If there is an interrupt received from the IMU sensor 30, then the process continues to operation 83. If an interrupt is not received, then the process returns to operation 81 for the controller 18 to sleep.

After the process continues to operation 83, the controller 18 will read the IMU sensor 30 position to determine the spatial orientation of the faucet handle 14. After the controller 18 reads the IMU sensor 30, the process continues to operation 84 where the controller 18 will use an algorithm to calculate the servo motor 42, 44 positions or look-up table for the servo motor 42, 44 positions according to the determined spatial orientation of the faucet handle. After the controller 18 determines the servo motor 42, 44 positions, the process continues to operation 85 where the controller 18 sends a signal to the flow control box 20 to change the servo motor 42 or 44 position to change the cold water value being released through pull down hose 24 to spray head 16. After the servo motor 42 or 44 position is changed, the process continues to operation 86 where the controller 18 sends a signal to the flow control box 20 to change the servo motor 42 or 44 position to change the hot water value being released through pull down hose 24 to spray head 16. After both servo motor 42, 44 positions are updated, the process returns to operation 81. In another embodiment, the hot water value may be changed first before the cold water value and so the corresponding servo motor 42 or 44 would change.

In another embodiment, the controller 18 may further wait for another interrupt after receiving an initial interrupt from the IMU sensor 30 to update the positions of the servo motors 42 or 44. The delay can be to wait for the final position the user intends to position the faucet handle 14. The delay may be a set predetermined period of time for the controller 18 to wait to receive additional interrupts. Therefore, the faucet 10 would only need to go through the process once instead of multiple times depending on how many sections the faucet handle 14 crosses.

Figure 9:
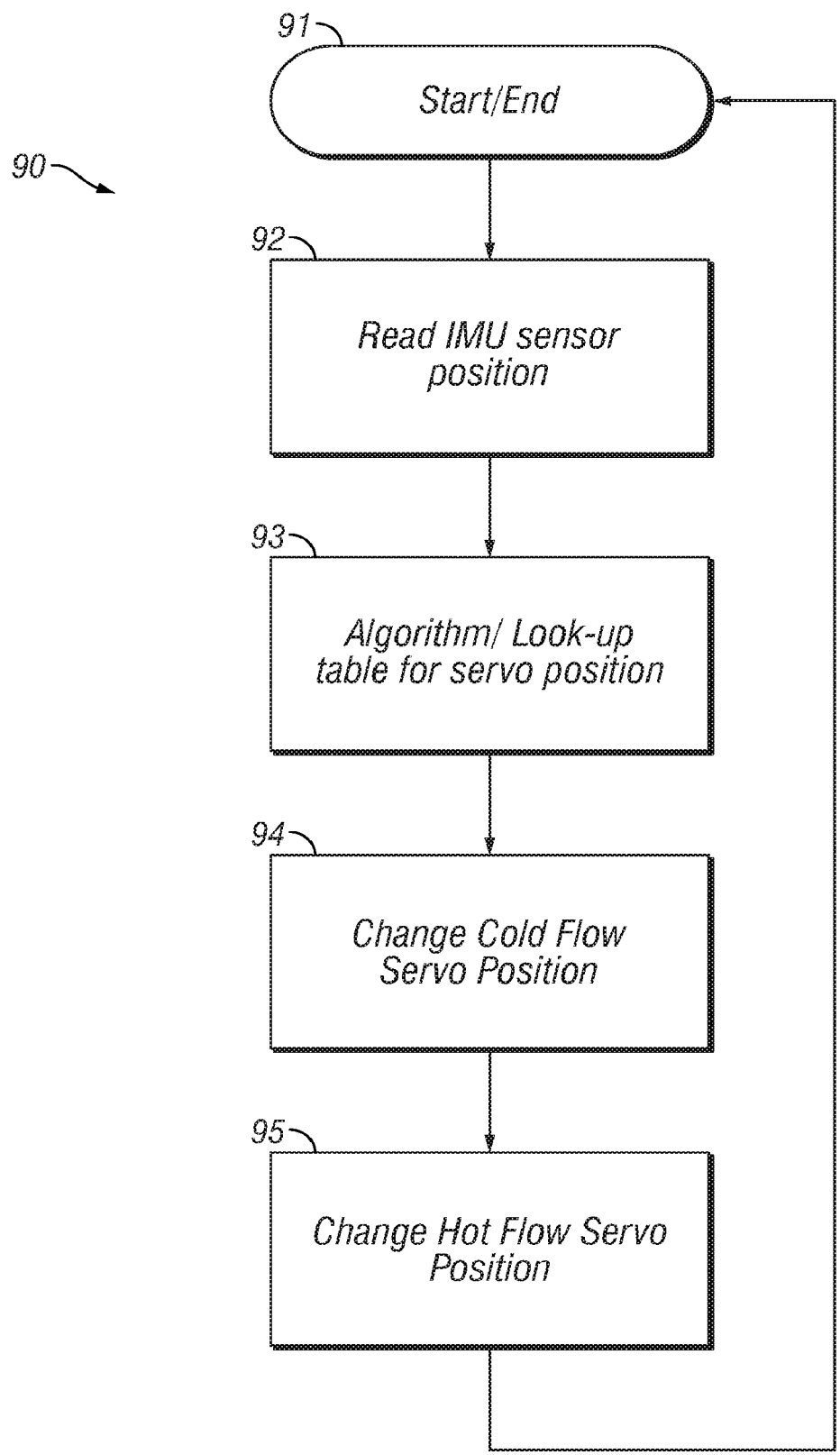
FIG. 9 is a simplified flowchart showing another example operation of the faucet according to an embodiment of the disclosure.

FIG. 9 is a simplified flow chart showing an example operation of the faucet 10. In the shown example, the faucet 10 uses a polling method 90 of controlling the operation of the flow control box 20. In the shown example, the polling method 90 begins with operation 91 in which the controller 18 starts and turns on. After the controller 18 is on, the process continues to operation 92 where the controller 18 reads the IMU sensor 30 position to determine the spatial orientation of the faucet handle 14. After the controller 18 reads the IMU sensor 30, the process continues to operation 93 where the controller 18 will use an algorithm to calculate the servo motor 42, 44 positions or look-up table for the servo motor 42, 44 positions according to the determined spatial orientation of the faucet handle 14. After the controller 18 determines the servo motor 42, 44 positions, the process continues to operation 94 where the controller 18 sends a signal to the flow control box 20 to change the servo motor 42 or 44 position to change the cold water value being released through pull down hose 24 to spray head 16. After the servo motor 42 or 44 position is changed, the process continues to operation 95 where the controller 18 sends a signal to the flow control box 20 to change the servo motor 42 or 44 position to change the hot water value being released through pull down hose 24 to spray head 16. After both servo motor 42, 44 positions are updated, the process returns to operation 91. In another embodiment, the hot water value may be changed first before the cold water value and so the corresponding servo motor 42 or 44 would change.

The polling method 90 can allow for a more continuous change in water flow and temperature than the interrupt method 80 because there is not a wait for an interrupt by the IMU sensor 30. However, the polling method 90 expends more energy by constantly updating the process. In one embodiment, the user can set the method of operation for the faucet 10. For example, there may be a switch (not shown) that can be used to change the method of operation for the faucet 10.

Figure 10C:
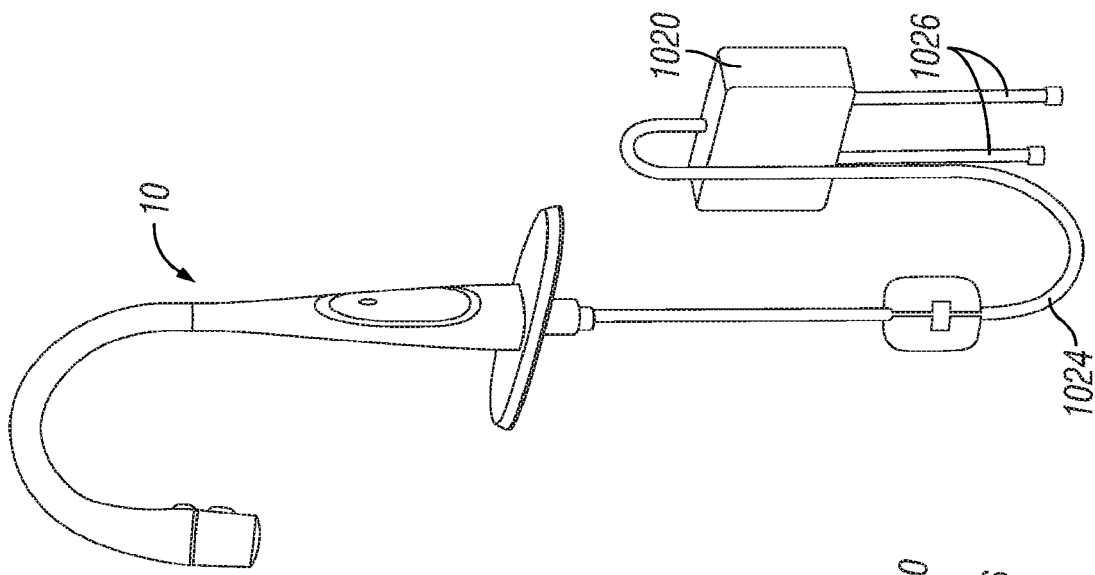
FIGS. 10A, 10B, and 10C illustrate a side-by-side comparison of three example kitchen faucets according to some embodiments of the disclosure.
Figure 10B:
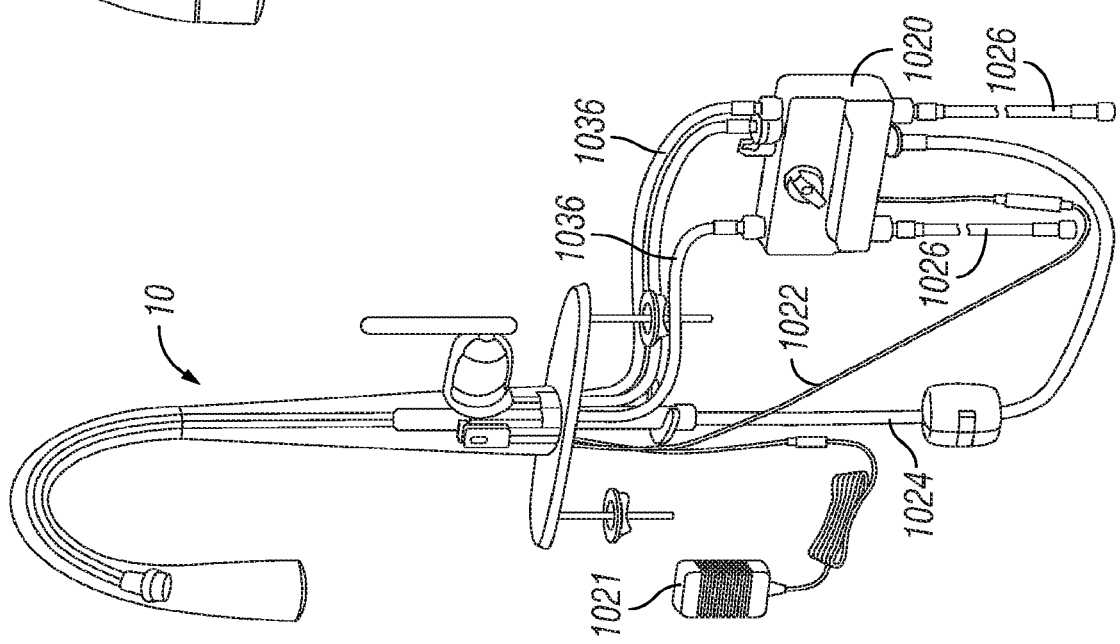
Figure 10A:
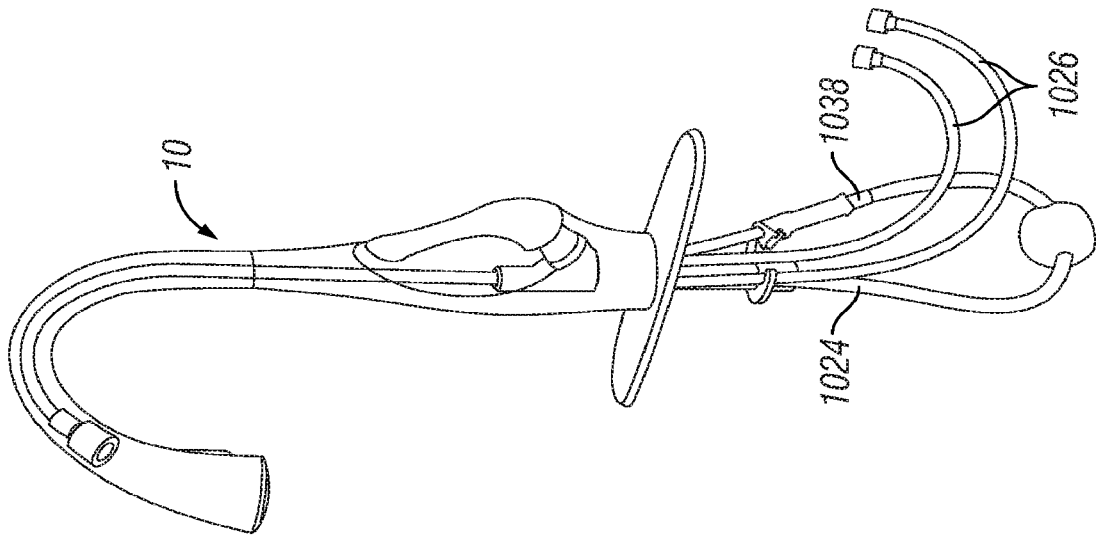

FIGS. 10A, 10B, and 10C illustrate a side-by-side comparison of three example kitchen faucets according to some embodiments of the disclosure. Referring to FIG. 10A, a traditional setup is shown. FIG. 10A shows a pull-down hose 1024 and water supply inlet hoses 1026. FIG. 10B shows a setup according to some embodiments of the disclosure. FIG. 10B includes a flow control box 1020, a power supply 1021, a signal wire 1022, a pull-down hose 1024, water supply inlet hoses 1026, and water outlet hoses 1036. FIG. 10C illustrates an electronically controlled setup and includes a flow control box 1020, a pull-down hose 1024, and water supply inlet hoses 1026. As can be seen from the side-by-side comparisons in FIGS. 10A, 10B, and 10C, the electronically controlled setup illustrated in FIG. 10C provides the technical advantage of simplifying installation in comparison to other faucets due to the reduction in the number of hoses that must be connected and the fact that only a single hose need be connected through the deck or countertop.

In some embodiments, like that shown in FIGS. 10B and 10C, the mixing and flow control of the water happen away from the faucet body 12. One advantage of keeping mixing and flow control of water away from the faucet body 12 is that the design constraints for the faucet body are freed up and fewer hoses may be used to simplify installation, repair, and removal. The system may include a command unit (e.g., where the signal that controls the water flow is generated) which could be voice control, a user interface, a handle configured like those shown in FIGS. 10A-C, a flow control box that houses the valve control system, a power supply, and hoses that supply the water to the faucet.

Figure 11A:
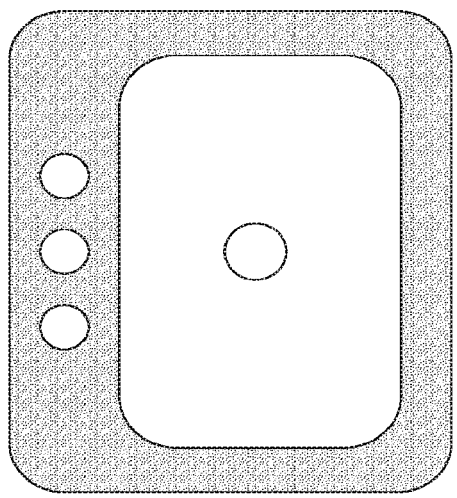
FIGS. 11A, 11B, 11C, and 11D illustrate example icons for use with the faucet according to an embodiment of the disclosure.
Figure 11B:
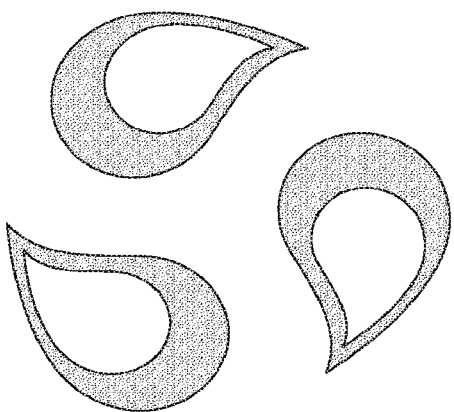
Figure 11C:
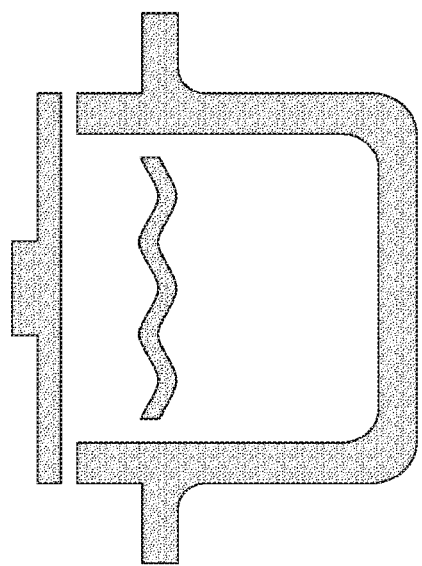
Figure 11D:
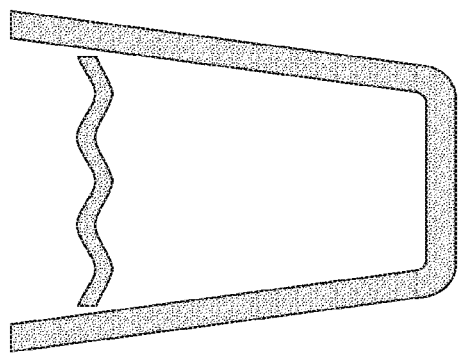

FIGS. 11A, 11B, 11C, and 11D illustrate example icons for use with the faucet according to an embodiment of the disclosure. FIG. 11A illustrates an example pot icon. In some embodiments, the interface 19 may display the pot icon of FIG. 11A when the faucet 10 receives a command to fill a pot. For example, the faucet 10 may receive a voice command, such as "Faucet, fill 6 quart pot," and the interface may illuminate to display the pot icon after receipt of the command and/or during operation of the faucet. FIG. 11B illustrates an example sink icon that may be displayed by interface 19 after receiving a command (e.g., "Faucet, fill sink") or during operation. FIG. 11C illustrates an example cup icon that may be displayed by interface 19 after receiving a command (e.g., "Faucet, fill cup" or "Faucet, fill 8 ounces") or during operation. FIG. 11D illustrates an example filter icon that may be displayed by interface 19 after receiving a command (e.g., "Faucet, 8 ounces of filtered water") or during operation.

Figure 13:
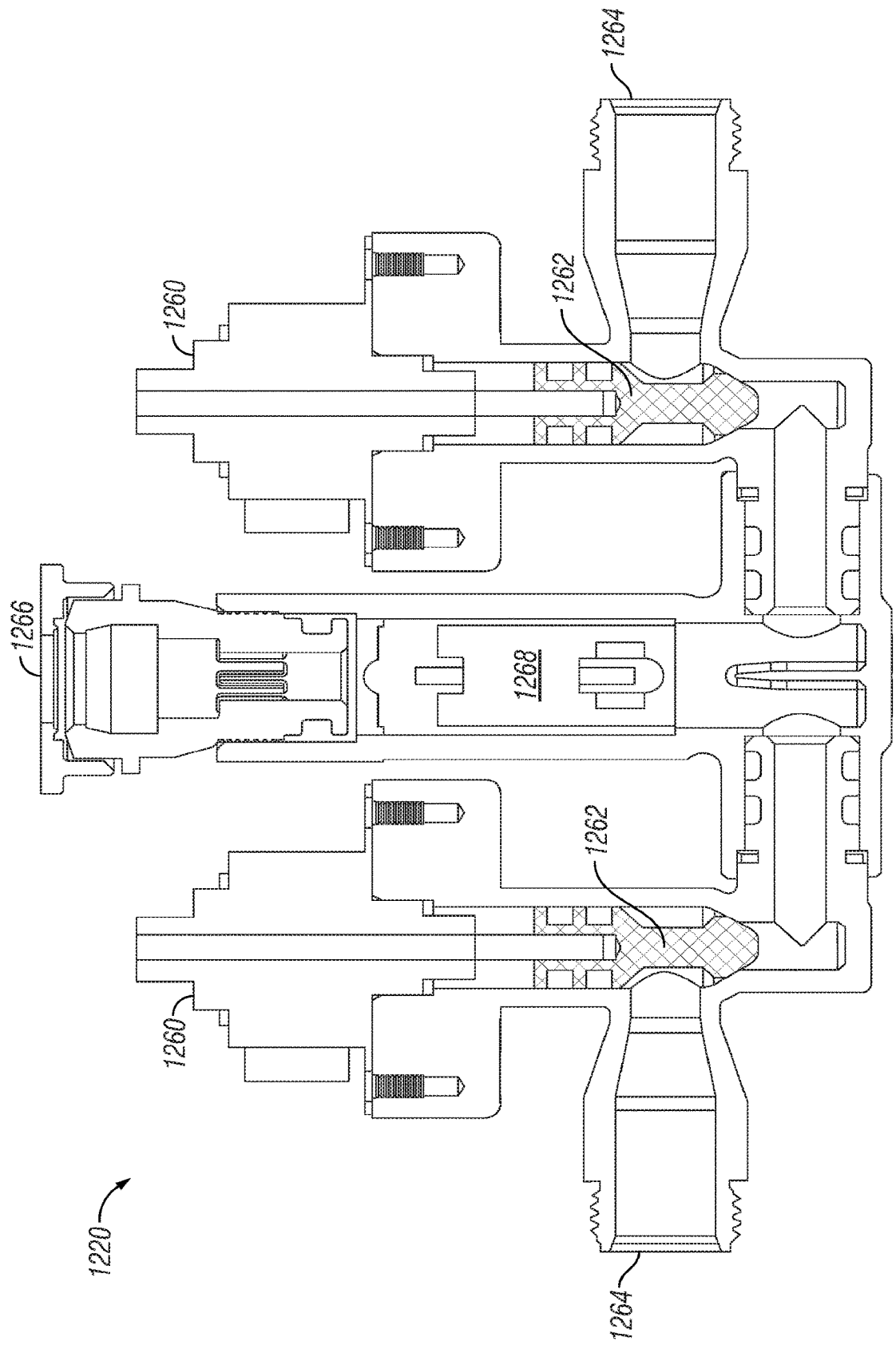
FIG. 13 is a cross-section view of the flow control box of FIG. 12.

FIG. 12 is a perspective view of some components of a needle valve flow control box according to some embodiments. FIG. 13 is a cross-section view of the flow control box of FIG. 12. FIGS. 12 and 13 show some components of a flow control box 1220, including linear stepper motors 1260, needle valves 1262, water supply inlet connections 1264, mixed water outlet connection 1266, and sensor(s) 1268. The flow control box 1220 may be connected to other components, such as control circuitry, networking circuitry, embedded systems, or other components. For example, the linear stepper motors 1260 and the sensor(s) 1268 may be connected to the controller 18, circuitry 17, and/or signal wire 22.

During operation according to some embodiments, hot and cold water supply inlet hoses are connected to the water supply inlet connections 1264. The needle valves 1262 are coupled to the linear stepper motors 1260 such that the linear stepper motors 1260 can move the needle valves to increase or decrease the flow of water to the faucet. Based on the desired water output (e.g., as received from a voice command, a spatial orientation command, a mechanical command), the controller may actuate one or both of the linear stepper motors 1260 which in turn moves the needle valve and in turn increases or decreases the amount of cold or hot water that is provided to the faucet via the mixed water outlet connection 1266.

One or more sensor(s) 1268 may be included with the faucet 10 and/or the flow control box 1220. For example, a flow rate sensor (e.g., a Hall-effect sensor) may be included to meter or determine the amount of water. This may be beneficial if a desired volume of water is needed. For example, a voice-controlled faucet may be able to receive a command such as "Faucet, fill a cup of water" or "Faucet, fill 3 quarts of water" and use the flow rate sensor to dispense that specific volume of water or close to that specific volume of water. Other sensors 1268 may be used as well. For example, the flow control box 1220 may include a temperature sensor. This may be beneficial if a desired temperature of water is needed. For example, the faucet may receive a command such as "Faucet, dispense at 200 degrees" and use the temperature sensor to mix the proper amount of hot and cold water to dispense water at the requested temperature. Similarly, the faucet 10 and flow control box 1220 may work in tandem with other components (e.g., the controller 18, circuitry 17), or with custom or user-defined programming (e.g., IFTTT). For example, the faucet may receive a command such as "Faucet, fill a cup of filtered water for green tea," look-up the correct temperate for steeping green tea (e.g., 175 degrees Fahrenheit), and dispense eight ounces of water at 175 degrees Fahrenheit.

Figure 14A:
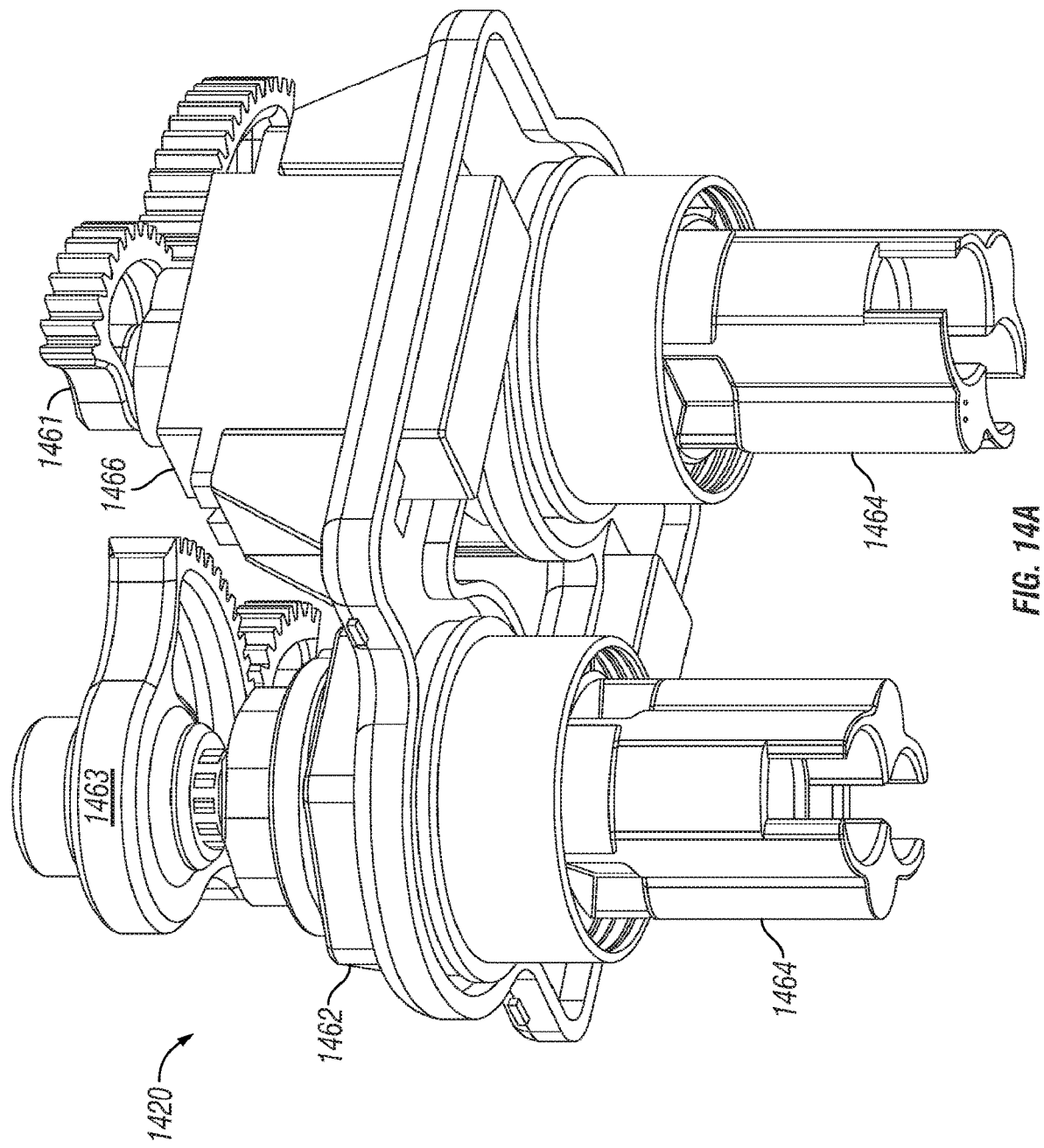
Figure 14C:
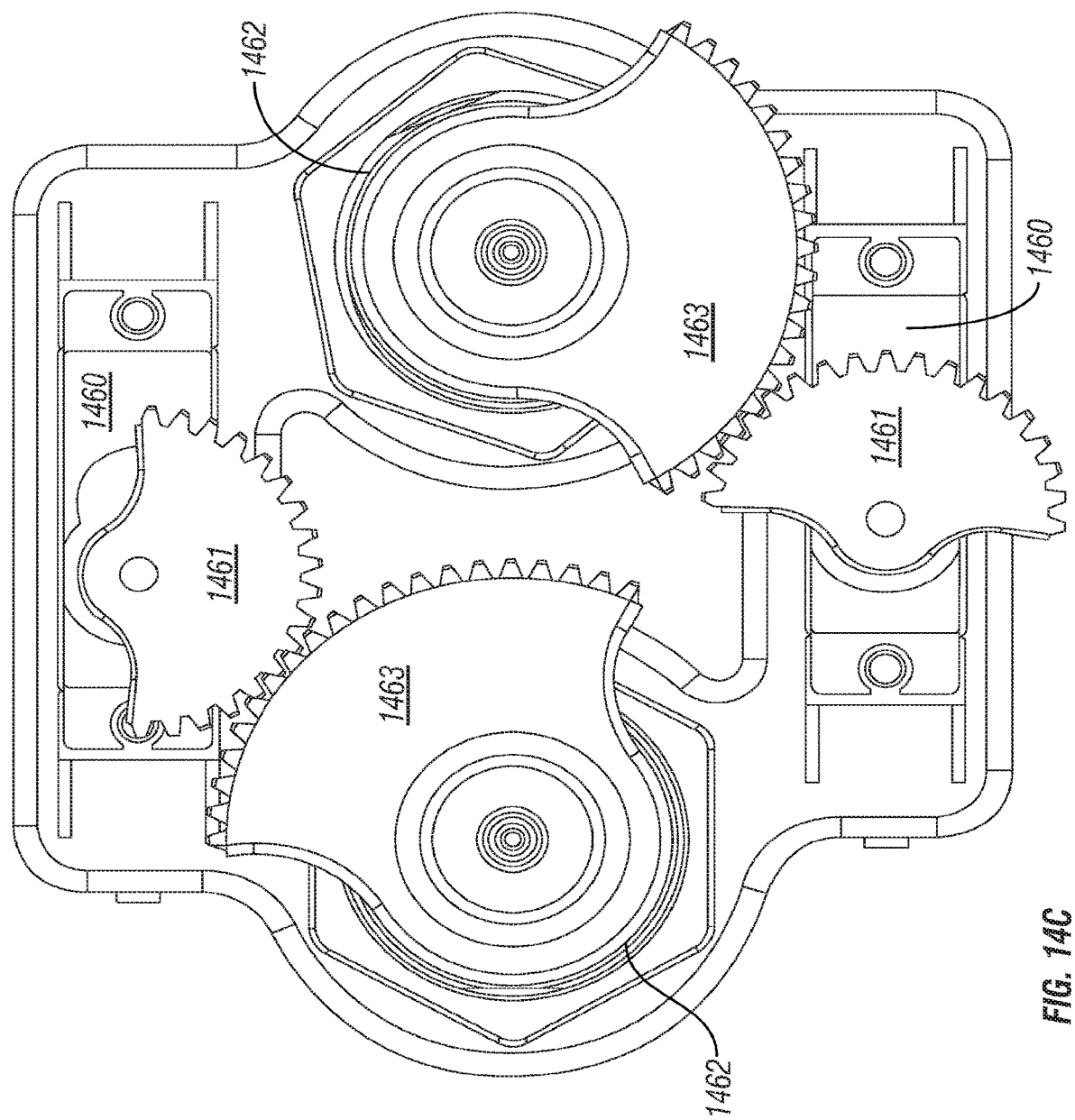

FIGS. 14A, 14B, and 14C illustrate some components of a flow control box 1420 with servomotor controls, according to an example embodiment. FIGS. 14A-C show some component of a flow control box 1420, including servomotors 1460, servomotor gears 1461, valves 1462, valve gears 1463, and water inlet supply connections 1464. The flow control box 1420 may be connected to other components, such as control circuitry, networking circuitry, embedded systems, sensors, or other components and as described elsewhere for other flow control boxes herein.

Still referring to FIGS. 14A-C, the two servomotors 1260 are coupled to the valves 1262 via the servomotor gears 1461 which are linked to valve respective valve gears 1463. In operation, the servomotors 1260 drive the position of the valves 1262. In some embodiments, the valves 1262 may be cartridge valves. For example, one valve could be connected to a cold supply line and another valve could be connected to a hot water line. Thus, a first servomotor could be used to control flow of cold water and a second servomotor could be used to control flow of hot water. As long as no obstructions or mechanical failures occur, the servomotors 1260 will drive its servomotor gear 1461 (via its output shaft) to the position of the control pulse. Thus, the faucet (e.g., via the controller 18, circuitry 17, or other circuitry) can safely assume the position of the valves 1262. As an added measure of monitoring and to help minimize errors, position feedback may be used such that the servomotors 1260 can monitor the position of its output shaft and thus its servomotor gear. An example of position feedback includes adding a feedback wire to a potentiometer or rotary encoder used with the servomotor drive.

Figure 15:
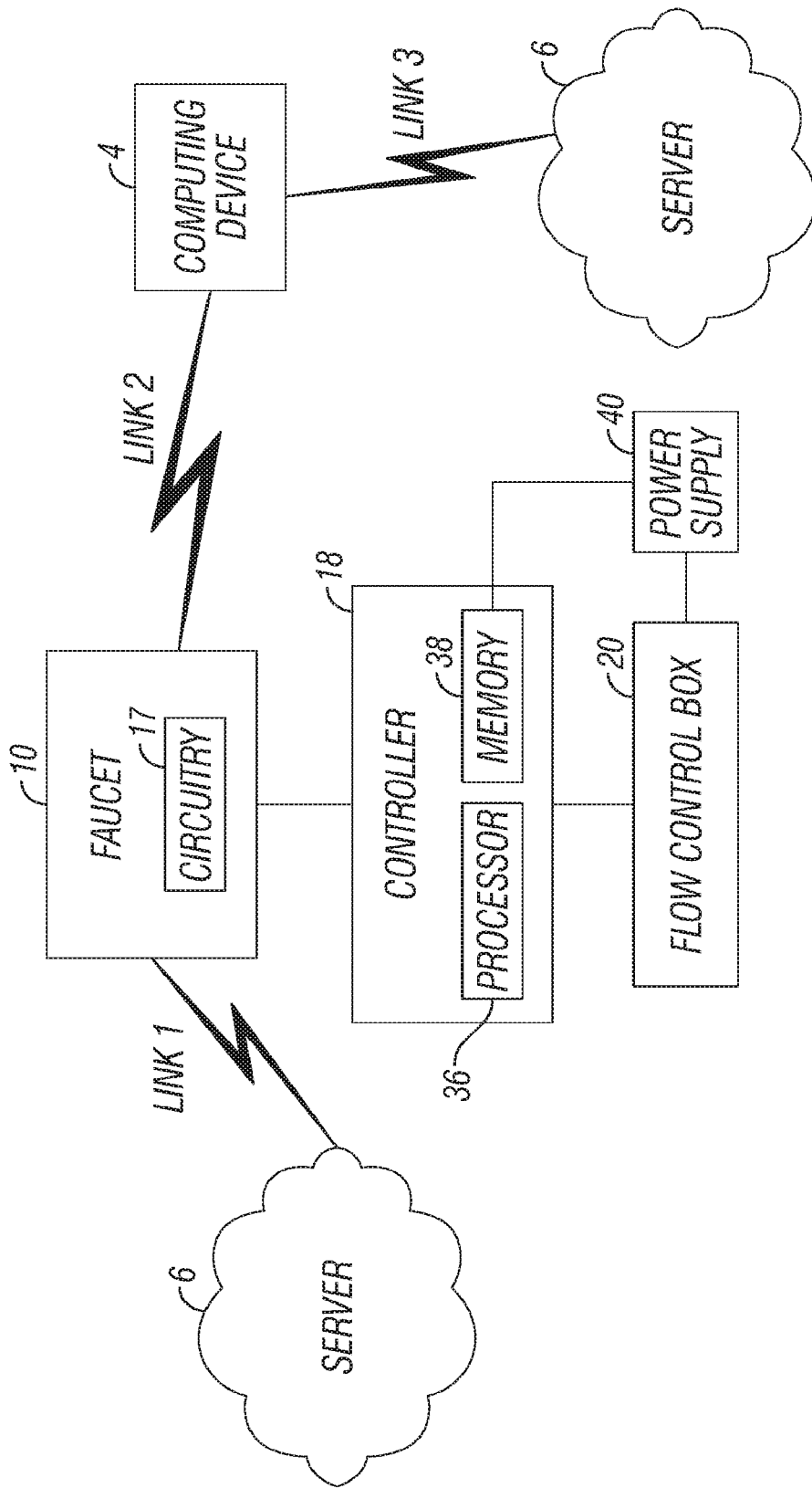
FIG. 15 illustrates an example electronic control system for controlling dispensing of water from the faucet 10.

Referring to FIG. 15, there is shown an example electronic control system for controlling dispensing of water from the faucet 10. In the example shown in FIG. 15, the control system includes the controller 18 including a processor 36 to process the signals received from the faucet circuitry 17 to send a signal to the flow control box 20 and a memory 38 to store instructions to be executed by the processor 36. The control system also includes a power supply 40 that is connected to the controller 18 and the flow control box 20. The faucet circuitry 17 may include networking components (e.g., Bluetooth, WiFi, mesh networking, ZigBee, etc.) such that the faucet 10 is communicatively coupled with other components. In some embodiments, the faucet 10 may use one or more communication links, such as Link 1 and Link 2 illustrated in FIG. 15.

In one embodiment, faucet 10 may have a microphone included in its circuitry 17 and be voice-enable. After receiving a voice command, faucet 10 may communicate with other computing devices via the Internet, a server, or another component (e.g., a networked computing device or a cloud network service) to determine what action to take based on the received voice command. In some embodiments, the faucet may have one than one microphone. For example, the microphone could be located adjacent to each other or at separate points on the faucet body. By way of example, the faucet may have one microphone on the front of the faucet body (sink facing) and another microphone on the back (backsplash facing). By way of another example, the faucet may have a microphone on the front of the faucet body (sink facing) and another microphone on the top of the spout tube (ceiling facing). Many variations of locations could be used depending on the circumstances.

The control system also includes the flow control box 20 (such as the needle valve or servomotor flow control boxes described herein) to control the water received from water supply inlet hoses 26 to output water.

In some embodiments, the faucet 10 may additionally or alternatively be communicatively coupled (e.g., via Links 2 and 3) to a computing device 4 which is in turn communicatively coupled to a server 6 or cloud network service. In one embodiment, the faucet 10 may be communicatively coupled to a computing device 4 such as a commercially-available consumer device (e.g., the Amazon Echo™ or the Google Home™). The computing device 4 may, in turn, be communicatively coupled to a server 6 (e.g., Amazon Web Servers), the Internet, or other computing devices. As described further with reference to FIG. 16 and method 1600, the faucet 10 may use the functionality of the computing device 4 (e.g., voice-recognition capabilities, network capabilities, programmable functionality, etc.) to boost its own functionality.

In one embodiment, networking more than one faucet provides additional functionality and metrics. For example, a home may include more than one faucet with functionality described herein such that the household aggregate water consumption (and other metrics such as temperature, time, etc.) through faucets could be tracked. This data may benefit predictive metrics and save time and money. For example, a household might be able to better predict when and how much hot water is needed in order to only heat the amount of water needed at the correct time.

Figure 16:
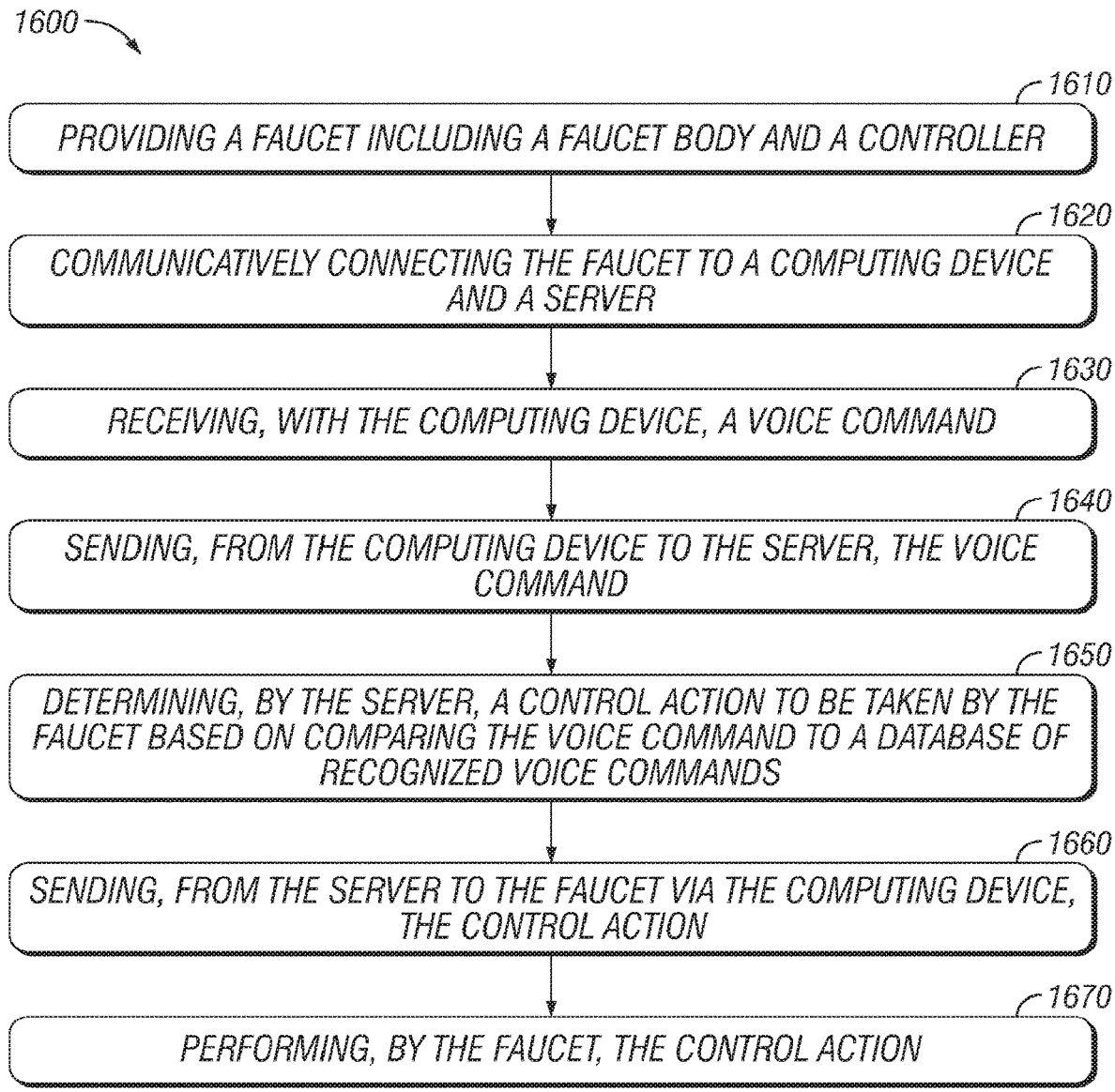
FIG. 16 is a simplified flow chart showing an example method 1600 of operation of the faucet 10.

FIG. 16 is a simplified flow chart showing an example method 1600 of operation of the faucet 10. In the shown example, the faucet 10 dispenses water in response to receiving a voice command. At 1610, a faucet includes a faucet body and a controller. At 1620, the faucet communicatively connects to a computing device and a server. At 1630 the computing device receives a voice command. At 1640, a computing device sends a voice command to the server. At 1650, the server determines a control action to be taken by the faucet based on a comparison of the voice command to a database of recognized voice commands. At 1660, the server sends to the faucet, via the computing device, the control action. At 1670, the faucet performs the control action.

Control actions described herein are not meant to be limiting and include, for example, adjusting the flow, temperature, rate, volume, and duration of water being dispensed by the faucet. In some cases, the faucet 10 may be controlled by speaking to it with set voice commands, which may be initiated by a predetermined and recognized voice trigger, such as "Faucet," "Computer," "Siri," "Alexa," or "OK Google." The faucet may perform the control actions, for example, by using a flow control box as described herein.

It is noted that the control action examples and voice triggers discussed above are intended as exemplary rather than limiting. For example, in association with faucet actuation control actions, one or more safety actions could also be included. For example, in some cases where a control action includes actuating or opening a faucet valve to dispense water, a further control action can be preset to occur, such as to turn off or close the faucet valve within a predetermined amount of time or based on sensing a condition (e.g., water rising above a predetermined level) detected by sensors surrounding the faucet. Still further, other safety checks can be included in control actions, e.g., to determine a proximity of the user before dispensing water, or to adjust water flow gradually over time, such that a water flow rate tapers off near an end of a dispensing control action.

Illustrative examples of the faucet disclosed herein are provided below. An embodiment of the faucet may include any one or more, and any combination of, the examples described below.

Example 1 is a method of controlling water dispensed from a faucet in response to receiving a voice command. The method includes receiving, with a computing device, a voice command associated with a faucet communicatively connected to the computing device, the faucet including a faucet body and a controller. The method also includes sending, from the computing device to the server, the voice command, and receiving a control action to be taken by the faucet from the server in response to the voice command. The method includes transmitting the control action to the faucet, thereby causing the faucet to perform the control action.

In Example 2, the subject matter of Example 1 is modified in that the control action is determined at the server based on comparing the voice command to a database of recognized voice commands.

In Example 3, a method of controlling water dispensed from a faucet in response to receiving a voice command includes receiving a voice command associated with a faucet, the faucet including a faucet body and a controller, and sending the voice command to a server. The method includes receiving a control action to be taken by the faucet from the server in response to the voice command, and performing, by the faucet, the control action.

In Example 4, the subject matter of Example 3 is modified in that the faucet includes an integrated microphone.

In Example 5, the subject matter of Example 4 is modified in that receiving the voice command associated with the faucet is performed at a computing device communicatively connected to the faucet and the server.

Example 6 is a faucet including a faucet body and a faucet handle. An inertial motion unit sensor is mounted inside the faucet handle to sense spatial orientation of the faucet handle. The faucet includes an electronic flow control system to adjust flow volume and temperature of water being dispensed. The faucet includes a controller configured to receive signals from the inertial motion unit sensor and control the electronic flow control system to adjust flow volume and temperature of water being dispensed based upon the position of the faucet handle.

In Example 7, the subject matter of Example 6 is further configured such that the inertial motion unit sensor includes at least one of a gyroscope, a magnetometer, or an accelerometer.

In Example 8, the subject matter of Example 6 is further configured such that a range of movement along a first axis of the faucet handle adjusts the flow volume of water being dispensed.

In Example 9, the subject matter of Example 8 is further configured such that a range of movement along a second axis of the faucet handle adjusts the temperature of the water being dispensed, where the first axis and the second axis are not coplanar.

In Example 10, the subject matter of Example 6 is further configured such that the electronic flow control system includes an electronic valve configured to control the flow volume of water being dispensed and wherein the controller is configured to control flow through the electronic valve based on a signal from the inertial motion unit.

In Example 11, the subject matter of Example 6 is further configured such that the controller is programmed with an algorithm configured to interpret a sensor output of the inertial motion unit to adjust the flow volume and temperature of water being dispensed.

In Example 12, the subject matter of Example 6 is further configured such that the controller is configured to use a look-up table to interpret a sensor output of the inertial motion unit to adjust the flow volume and temperature of water being dispensed.

In Example 13, the subject matter of Example 6 is further configured with a flow control box is configured to be connected to at least two of a plurality of water supply inlet hoses and at least one outlet hose in fluid communication with the faucet body. The flow control box includes the electric flow control system.

In Example 14, the subject matter of Example 6 is further configured such that the controller is configured to substantially continuously check for an interrupt from the inertial motion unit to read the inertial motion unit sensor in order for controlling the electronic flow control system to adjust the flow volume and temperature of water.

In Example 15, the subject matter of Example 6 is further configured such that the controller is configured to substantially continuously read the inertial motion unit in order for controlling the electronic flow control system to adjust the flow volume and temperature of water.

In Example 16, the subject matter of Example 6 is further configured with a user-selectable portion in electrical communication with the controller from which reading the inertial motion unit can be selected between: (1) substantially continuously checking for an interrupt from the inertial motion unit to read the inertial motion unit sensor; and (2) substantially continuously reading the inertial motion unit.

In Example 17, the subject matter of Example 6 is further configured with a user-selectable portion in electrical communication with the controller from which interpretation of sensor output of the inertial motion unit can be adjusted: (1) by adjusting an algorithm configured to interpret a sensor output of the inertial motion unit to adjust the flow volume and temperature of water being dispensed; and/or (2) adjusting at least a portion of a look-up table to interpret a sensor output of the inertial motion unit to adjust the flow volume and temperature of water being dispensed.

Example 18 provides a method of controlling a flow volume and a temperature of water dispensed from a faucet. The method includes providing a faucet including a faucet body and a faucet handle. An inertial motion unit sensor measures a spatial orientation of the faucet handle. A controller receives a measurement of the spatial orientation of the faucet handle from the inertial motion unit sensor. The controller provides a signal to an electric flow control system to adjust the flow volume and temperature of water being dispensed. The electric flow control system adjusts the flow volume and temperature of water dispensed based upon the measurement of the spatial orientation of the faucet handle.

In Example 19, the subject matter of Example 18 is further configured such that the inertial motion unit sensor includes at least one of a gyroscope, a magnetometer, or an accelerometer.

In Example 20, the subject matter of Example 18 is further configured by adjusting the flow volume of water dispensed based upon a range of motion along one axis of the faucet handle.

In Example 21, the subject matter of Example 18 is further configured by adjusting the temperature of water dispensed based upon a range of motion along one axis of the faucet handle.

In Example 22, the subject matter of Example 18 is further configured such that the electronic flow control system includes at least two of a plurality of servo motors to control the flow volume of water being dispensed.

In Example 23, the subject matter of Example 18 is further configured by interpreting the measurement of the spatial orientation of the faucet handle with the controller by using an algorithm to adjust the flow volume and temperature of water being dispensed.

In Example 24, the subject matter of Example 18 is further configured by interpreting the measurement of the spatial orientation of the faucet handle with the controller by using a look-up table to adjust the flow volume and temperature of water being dispensed.

In Example 25, the subject matter of Example 18 is further configured by connecting at least two of a plurality of water supply inlet hoses and at least one of an outlet hose in fluid communication with the faucet body. The flow control box includes the electric flow control system.

In Example 26, the subject matter of Example 18 is further configured by checking continuously for an interrupt from the inertial motion unit with the controller to read the inertial motion unit sensor in order to control the electronic flow control system to adjust the flow volume and temperature of water.

In Example 27, the subject matter of Example 18 is further configured by reading continuously the inertial motion unit with the controller in order to control the electronic flow control system to adjust the flow volume and temperature of water.

In Example 28, the subject matter of Example 18 is further configured such that the controller wirelessly receives the measurement of the spatial orientation of the faucet handle from the inertial motion unit sensor.

In Example 29, the subject matter of Example 18 is further configured such that the controller wirelessly provides the signal to the electric flow control system to adjust the flow volume and/or temperature of water being dispensed.

Example 30 is a faucet with a faucet body. The faucet includes an electronic flow control system to adjust flow volume of water being dispensed. The faucet includes a controller configured to receive signals from a computing device and control the electronic flow control system to adjust flow volume of water being dispensed. The computing device further includes computing device comprises a microphone and voice recognition functionality. The controller controls the electronic flow control system to adjust flow volume of water being dispensed based upon a voice command received from by the computing device.

Example 31 provides a method of controlling water dispensed from a faucet in response to receiving a voice command. The method includes providing a faucet including a faucet body and a controller. The method includes communicatively connecting the faucet to a computing device and a server. The method includes receiving, with the computing device, a voice command. The method includes sending, from the computing device to the server, the voice command. The method includes determining, by the server, a control action to be taken by the faucet based on comparing the voice command to a database of recognized voice commands. The method includes sending, from the server to the faucet via the computing device, the control action. The method includes performing, by the faucet, the control action.

In Example 32, the subject matter of Example 31 is further configured such that the voice command is initiated with a predetermined voice trigger.

The invention claimed is:

1. A faucet assembly comprising:
a faucet including:
a faucet body;
an interface integrated with the faucet body at a forward-oriented surface of a portion of the faucet body extending upwardly from a countertop when installed; and
an electronic flow control system to adjust flow volume of water being dispensed, the electronic flow control system being contained within a flow control enclosure; and
a controller configured to control the electronic flow control system to adjust flow volume of water being dispensed;
wherein the electronic flow control system includes a first valve and a second valve, wherein operation of each of the first and second valves is controlled by a motor, respectively, of the electronic flow control system,
wherein the controller controls the electronic flow control system to adjust flow volume of water being dispensed based upon a voice command received at a microphone and processed by sending the voice command to a server,
wherein the interface has an appearance of a single piece integral with the faucet body when non-illuminated, and includes a plurality of icons associated with operating functions selected by voice commands, the interface being configured to illuminate to indicate a current operating condition of the faucet.

2. The faucet assembly of claim 1, wherein the microphone is separate from the controller.

3. The faucet assembly of claim 1, further comprising a computing device communicatively coupled to the controller, the computing device receiving the voice command from the microphone and communicating the voice command to the server.

4. The faucet assembly of claim 3, wherein the computing device is separate from the faucet.

5. The faucet assembly of claim 4, wherein the microphone is separate from the computing device.

6. The faucet assembly of claim 1, wherein the interface includes one or more visual indicators and the one or more visual indicators includes a first icon indicating that a first voice command is being executed by the faucet and a second icon indicating that a second voice command is being executed by the faucet, the second voice command being different from the first voice command.

7. The faucet assembly of claim 6, wherein the first voice command comprises a command to dispense a predetermined volume of liquid.

8. The faucet assembly of claim 7, wherein the second voice command comprises a command to dispense filtered water.

9. The faucet assembly of claim 1, further comprising a second microphone positioned on the faucet body.

10. The faucet assembly of claim 1, wherein the voice command includes a request to dispense water at a predetermined temperature.

11. The faucet assembly of claim 10, further comprising a temperature sensor positioned within the flow control enclosure.

12. The faucet assembly of claim 1, wherein the flow control enclosure and the controller are located below a countertop to which the faucet is installed, and the microphone is located above the countertop apart from the flow control enclosure and the controller.

13. The faucet assembly of claim 1, wherein the faucet further includes a spray head detachable from the faucet body.

14. A method of controlling water dispensed from a faucet, the method comprising:
- receiving, via a microphone, a voice command associated with a faucet, the faucet including a faucet body and a controller;
- sending the voice command to a server;
- receiving a control action to be taken by the faucet from the server in response to the voice command; and
- transmitting the control action to a flow control enclosure of the faucet to cause the faucet to perform the control action,
- wherein the flow control enclosure connects to at least two of a plurality of water supply inlet hoses and at least one outlet hose extending from the flow control enclosure into the faucet body, the flow control enclosure including a first valve and a second valve, the first and second valves being electronically controllable via the control action, and wherein operation of each of the first and second valves is controlled by a motor within the flow control enclosure,
- wherein an interface has an appearance of a single piece integral with the faucet body when non-illuminated, and includes a plurality of icons associated with operating functions selected by voice commands, the interface being configured to illuminate to indicate a current operating condition of the faucet and wherein the interface is integrated with the faucet body at a forward-oriented surface of a portion of the faucet body extending upwardly from a countertop when installed.

15. The method of claim 14, further comprising monitoring aggregate water consumption through the faucet for a predetermined time period.

16. The method of claim 15, further comprising generating one or more predictive metrics based on the aggregate water consumption.

17. The method of claim 16, further comprising predicting a time at which water of a predetermined temperature will be requested.

18. The method of claim 14, wherein the interface illuminates to indicate the current operating condition of the faucet includes:
- displaying, on the interface integrated into the faucet body, one or more visual indicators identifying an operating status of the faucet in response to receipt of the voice command.

19. The faucet assembly of claim 1, wherein the interface appears to be made of the same material as the faucet body when the interface is not illuminated.

* * * * *